(12) United States Patent
Bell et al.

(10) Patent No.: US 8,464,864 B2
(45) Date of Patent: Jun. 18, 2013

(54) GUIDE RAIL SYSTEM

(75) Inventors: Glen A. Bell, Waterloo (CA); Daniel J. Turner, Kitchener (CA); Edward P. Kozak, Alma (CA)

(73) Assignee: Septimatech Group Inc., Waterloo, ON ( * ) Notice: Subject to any disclaimer, the term of this patent is extended or adjusted under 35 U.S.C. 154(b) by 0 days.

(21) Appl. No.: 13/285,540

(22) Filed: Oct. 31, 2011

(65) Prior Publication Data

US 2012/0103763 A1    May 3, 2012

Related U.S. Application Data

(60) Provisional application No. 61/408,233, filed on Oct. 29, 2010.

(51) Int. Cl.
*B65G 21/20* (2006.01)

(52) U.S. Cl.
USPC ........................................... 198/836.3

(58) Field of Classification Search
USPC ............................... 198/836.1, 836.3
See application file for complete search history.

(56) References Cited

U.S. PATENT DOCUMENTS

| | | | |
|---|---|---|---|
| 3,527,336 A | 9/1970 | Johnston | |
| 4,982,835 A | 1/1991 | Butler et al. | |
| 5,211,280 A | 5/1993 | Houde | |
| 5,291,988 A | 3/1994 | Leonard | |
| 5,492,218 A | 2/1996 | Falkowski | |
| 5,515,668 A | 5/1996 | Hunt et al. | |
| 5,517,798 A | 5/1996 | Klopfenstein | |
| 5,638,659 A | 6/1997 | Moncrief et al. | |
| 5,682,976 A * | 11/1997 | Jorgensen | 198/836.3 |
| 5,782,339 A * | 7/1998 | Drewitz | 198/836.3 |
| 5,819,911 A | 10/1998 | Ledingham | |
| 5,860,511 A * | 1/1999 | Ensch et al. | 198/836.3 |
| 5,992,616 A * | 11/1999 | Kliesow et al. | 198/836.3 |
| 6,050,396 A | 4/2000 | Moore | |
| 6,360,880 B1 | 3/2002 | Ouellette | |
| 6,378,695 B1 | 4/2002 | Rinne | |
| 6,454,084 B2 | 9/2002 | Csiki et al. | |
| 6,533,110 B1 * | 3/2003 | Ledingham | 198/861.1 |
| 6,578,702 B2 | 6/2003 | Falkowski | |
| 6,591,978 B2 | 7/2003 | Ledingham | |
| 6,827,205 B2 | 12/2004 | Ledingham | |
| 7,310,983 B2 | 12/2007 | Schill et al. | |
| 7,431,150 B2 | 10/2008 | Ranger | |
| 7,721,876 B2 | 5/2010 | Hartness et al. | |
| 8,186,503 B1 | 5/2012 | Burchell et al. | |
| 2006/0144015 A1 | 7/2006 | Cash, III et al. | |
| 2011/0079493 A1 | 4/2011 | Bell | |

* cited by examiner

*Primary Examiner* — James R Bidwell

(57) ABSTRACT

A guide rail system for guiding containers on a conveyor on which the containers are moved. The guide rail system includes first and second contact portions for engaging the containers to at least partially locate the containers respectively in preselected positions on a surface of the conveyor, first and second adjustment elements positioned proximal to first and second sides of the conveyor respectively, on which the first and second contact portions are mounted, and first and second adjustable point devices spaced apart from each other along the first and second sides respectively, for moving the adjustment elements transversely. The system also includes one or more height adjustment assemblies for positioning side contact portions selected from the group consisting of the first contact portions, the second contact portions, and the first and second contact portions in predetermined locations therefor relative to the surface of the conveyor.

12 Claims, 16 Drawing Sheets

GUIDE RAIL SYSTEM

This application claims the benefit of U.S. Provisional Patent Application No. 61/408,233, filed Oct. 29, 2010, and incorporates such provisional patent application in its entirety by reference.

FIELD OF THE INVENTION

The present invention is a guide rail system for guiding containers moved by one or more conveyors.

BACKGROUND OF THE INVENTION

Conventional guide rails are fixed in position along a conveyor to guide containers as the conveyor moves the containers past the guide rails. For example, the containers may be bottles, boxes or jars into which a product is to be placed, or which are to be further processed (e.g., capping, label application, or packaging), as is well known in the art. Also, the item conveyed may be part of a package, e.g., a cap or closure for a bottle or can. For the purposes of this application, it will be understood that "container" refers to bottles, boxes, jars, cans, and other vessels for holding materials, as well as caps or closures for such vessels. Many different types of conveyors are known, e.g., table-top conveyors, roller conveyors, belt conveyors, beaded conveyors, and air-veyors. Typically, the conveyor moves the container relatively rapidly past the guide rails. Ideally, the guide rails are formed and positioned so that the containers are gently and precisely guided between the guide rails, as is known.

However, the fixed conventional guide rails cannot easily be changed if the shape and/or dimensions of the containers which are to be guided thereby change. In particular, quick vertical adjustment of guide rails is generally not available in the prior art. Adjustable guide rail systems are known, but they have a number of disadvantages. For instance, in one known system, the guide rail is positionable closer to, or further away from, a conveyor in predetermined increments determined by blocks which are insertable to position the guide rail. This arrangement, however, does not provide the flexibility which may be needed, because the guide rails can only be positioned in certain positions, according to the sizes of the blocks. Because the blocks only permit changes in the positions of the guide rails in predetermined increments, this prior art system cannot accommodate all changes in position. Also, in this prior art arrangement, changing the positions of the guide rails is relatively time-consuming.

In another known adjustable guide rail, an adjustment to the guide rail's position is made by using compressed air acting on cylinders, but this prior art system requires that the necessary air pressure be maintained, to hold the guide rail in a required position relative to the conveyor. Also, the ability of this prior art system to accommodate different container sizes is limited.

Because the adjustable guide rails typically are made up of a number of relatively short guide rail portions, each of which is mounted separately on its own support bracket, and because each of the guide rail portions is moved on its support bracket independently of the other guide rail portions, adjusting the known adjustable guide rail systems for different containers tends to be a time-consuming, and sometimes difficult, job.

In some applications, a transition portion is required to be made from a first portion of the conveyor in which only the guide rails on one side are adjustable, to a second portion in which the guide rails on both sides of the conveyor are adjustable (or vice versa). In the first portion, the center line of the bottle (or container) path typically is not coincident with the center line of the conveyor, but in the second portion, the center line of the bottle (or container) path is coincident with the center line of the conveyor. In the transition portion, the guide rails at the ends of the transition portion must be positioned so that they will provide for a smooth transition from the first and second portions. If the positions of the guide rails in the first and second portions are required to change, then the positions of the guide rails in the transition portion are required to be changed accordingly as well. In the prior art, adjustment of the guide rails in the prior art transition portions is time-consuming and difficult, as each guide rail segment in the transition portion is required to be adjusted separately.

It is important that the guide rails be accurately positioned relative to the conveyor, and the containers thereon. For instance, if the containers are not properly positioned by the guide rails, the containers may "shingle", or jam, frequently. Also, where the containers are guided into equipment in which the containers are processed or acted on (e.g., fillers, or labeling machines), if the containers are not properly positioned, they will not be properly processed. In general, the accuracy of the adjustable guide rail systems of the prior art is not particularly good.

SUMMARY OF THE INVENTION

For the foregoing reasons, there is a need for a guide rail system that overcomes or mitigates one or more of the disadvantages of the prior art.

In its broad aspect, the invention provides a guide rail system for guiding containers on one or more conveyors on which the containers are moved. The guide rail system includes a number of first and second contact portions for engaging the containers, to at least partially locate the containers respectively in preselected positions on one or more surfaces of the conveyor relative to a center line of the conveyor, the center line being located substantially equidistant from opposing first and second sides of the conveyor. The guide rail system also includes a number of first and second adjustment elements positioned proximal to the first and second sides respectively, the first and second contact portions being mounted on the first and second adjustment elements respectively. Also, the guide rail system includes a number of first and second adjustable point devices, the first and second adjustable point devices being spaced apart from each other along the first and second sides respectively, the first and second adjustment elements being mounted in the first and second adjustable point devices respectively and being transversely movable thereby relative to the center line for positioning the first and second contact portions in predetermined locations therefor relative to the center line for engagement thereby with the containers as the containers are moved past the first and second contact portions by the conveyor, to at least partially locate the containers in the preselected positions therefor. In addition, the guide rail system includes one or more height adjustment assemblies for positioning side contact portions selected from the group consisting of the first contact portions, the second contact portions, and the first and second contact portions in the predetermined locations therefor relative to said at least one surface of said at least one conveyor.

In another of its aspects, the invention provides a guide rail system including a downstream segment at least partially defined by a downstream segment center line of the conveyor substantially equidistant from first and second downstream segment sides thereof. The downstream segment includes a number of first and second downstream segment contact portions for engaging the containers, to at least partially locate the containers respectively in downstream segment preselected positions on the conveyors on a downstream path partially defined by the first and second downstream segment contact portions. The downstream segment also includes a number of first and second downstream segment adjustment elements positioned proximal to the first and second downstream segment sides respectively, the first and second downstream segment contact portions being mounted on the first and second downstream segment adjustment elements respectively, and a number of first and second downstream segment adjustable point devices, the first and second downstream segment adjustable point devices being spaced apart from each other along the first and second downstream segment sides respectively, the first and second downstream segment adjustment elements being mounted in the first and second downstream segment adjustable point devices respectively and being transversely movable thereby relative to the downstream segment center line for positioning the first and second downstream segment contact portions in predetermined locations therefor relative to the downstream segment center line for engagement thereby with the containers as the containers are moved past the first and second downstream segment contact portions by said at least one conveyor, to at least partially locate the containers in the downstream segment preselected positions therefor. The guide rail system also includes an upstream segment at least partially defined by an upstream segment center line of the conveyor substantially equidistant from first and second upstream sides thereof. The upstream segment includes a number of first and second upstream segment contact portions for engaging the containers, to at least partially locate the containers respectively in upstream segment preselected positions on the conveyor on an upstream path partially defined by the first and second upstream segment contact portions. The upstream segment also includes a number of first and second upstream segment adjustment elements positioned proximal to the first and second upstream segment sides respectively, the first and second upstream segment contact portions being mounted on the first and second upstream segment adjustment elements respectively, and a number of first and second upstream segment adjustable point devices, the first and second upstream segment adjustable point devices being spaced apart from each other along the first and second upstream segment sides respectively, the first and second upstream segment adjustment elements being mounted in the first and second upstream segment adjustable point devices respectively and being transversely movable thereby relative to the upstream segment center line for positioning the first and second upstream segment contact portions in upstream segment predetermined locations therefor relative to the upstream segment center line for engagement thereby with the containers as the containers are moved past the first and second upstream segment contact portions by said at least one conveyor, to at least partially locate the containers in the upstream segment preselected positions therefor. The downstream and upstream segments are spaced apart from each other longitudinally and transversely. The guide rail system also includes a centering device positioned between the downstream and upstream segments, the centering device extending between a downstream end thereof positioned adjacent to the downstream segment and an upstream end thereof positioned adjacent to the upstream segment. The centering device includes a downstream end portion comprising first and second downstream end contact portions positioned proximal to the first and second downstream segment contact portions and substantially aligned with the first and second downstream contact portions respectively to partially define the downstream path. The centering device also includes an upstream end portion comprising first and second upstream end contact portions positioned proximal to the first and second upstream segment contact portions and substantially aligned with the first and second upstream segment contact portions respectively to partially define the upstream path. The centering device also includes first and second downstream end adjustable point devices positioned proximal to the downstream end, the first and second downstream end adjustable point devices having first and second downstream end adjustment elements mounted therein respectively, and transversely movable relative to a downstream end center line of the conveyor located proximal to the downstream end portion, and first and second upstream end adjustable point devices positioned proximal to the upstream end, the first and second upstream end adjustable point devices having first and second upstream end adjustment elements mounted therein respectively, and transversely movable relative to an upstream end center line of the conveyor located proximal to the upstream end portion. The first and second downstream end contact portions are mounted on the first and second downstream end adjustment elements respectively, and the first and second upstream end contact portions are mounted on the first and second upstream end adjustment elements respectively. The centering device also includes first and second main contact portions extending between downstream and upstream ends thereof and pivotally connected to the first and second downstream end contact portions respectively and to the first and second upstream end contact portions at its downstream and upstream ends respectively, the first and second main contact portions being positioned for engagement with the containers, to at least partially locate the containers in main portion preselected positions on the conveyor on a central path defined by the first and second main contact portions. The first and second downstream end contact portions are positionable to partially define the downstream path in first and second downstream end predetermined locations therefor respectively by the first and second downstream end adjustment elements respectively in which the first and second downstream end contact portions are substantially aligned with the first and second downstream contact portions respectively. The first and second upstream end contact portions are positionable to partially define the upstream path in upstream end predetermined locations therefor by the first and second upstream end adjustment elements respectively in which the first and second upstream end contact portions are substantially aligned with the first and second upstream contact portions respectively. The first and second upstream end contact portions, the first and second main contact portions, and the first and second downstream end contact portions are positioned to guide the containers from the upstream preselected positions therefor to the downstream preselected positions therefor.

BRIEF DESCRIPTION OF THE DRAWINGS

The invention will be better understood with reference to the attached drawings, in which.

DETAILED DESCRIPTION

Figure 1A:
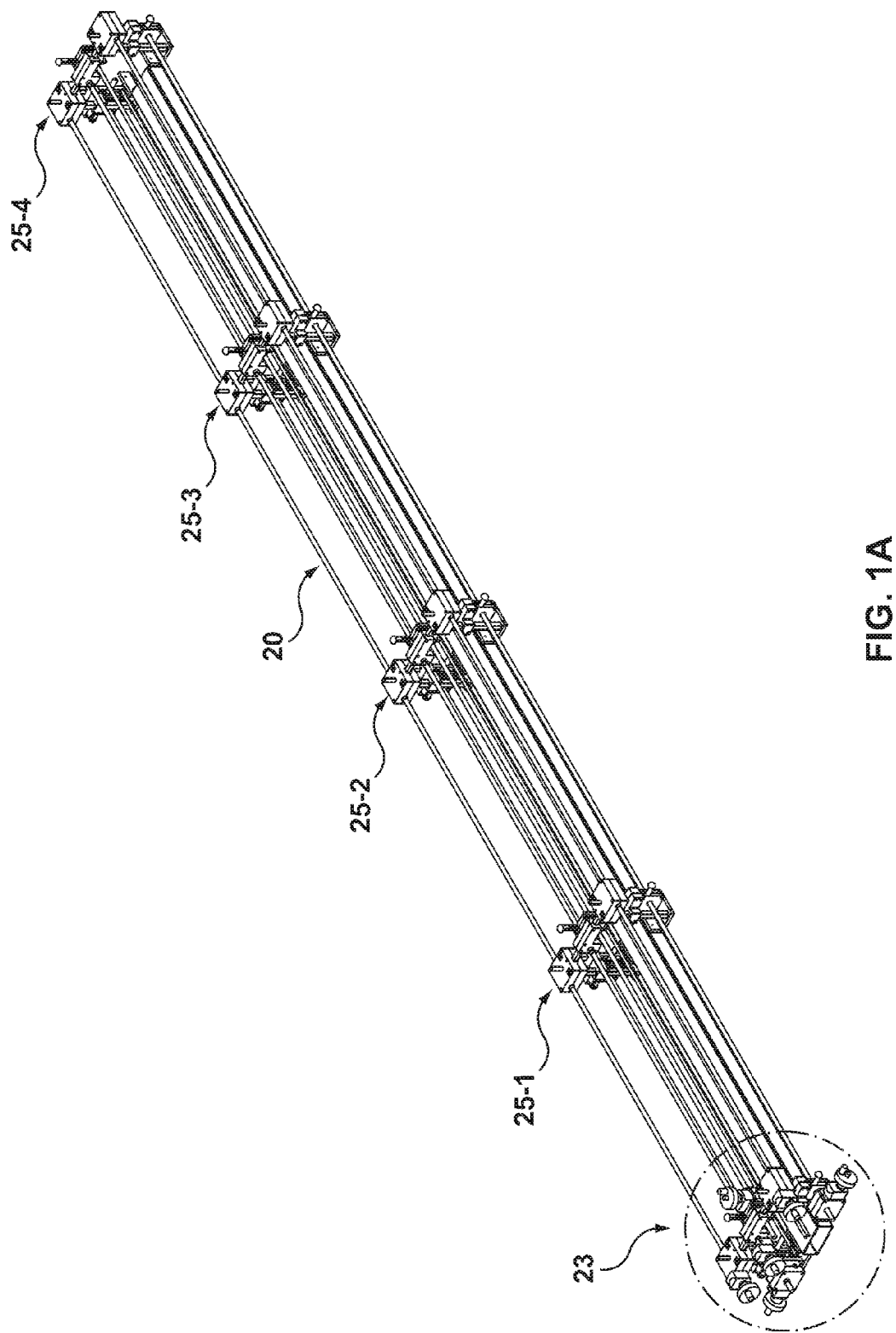
FIG. 1A is an isometric view of an embodiment of a guide rail system of the invention.
Figure 1B:
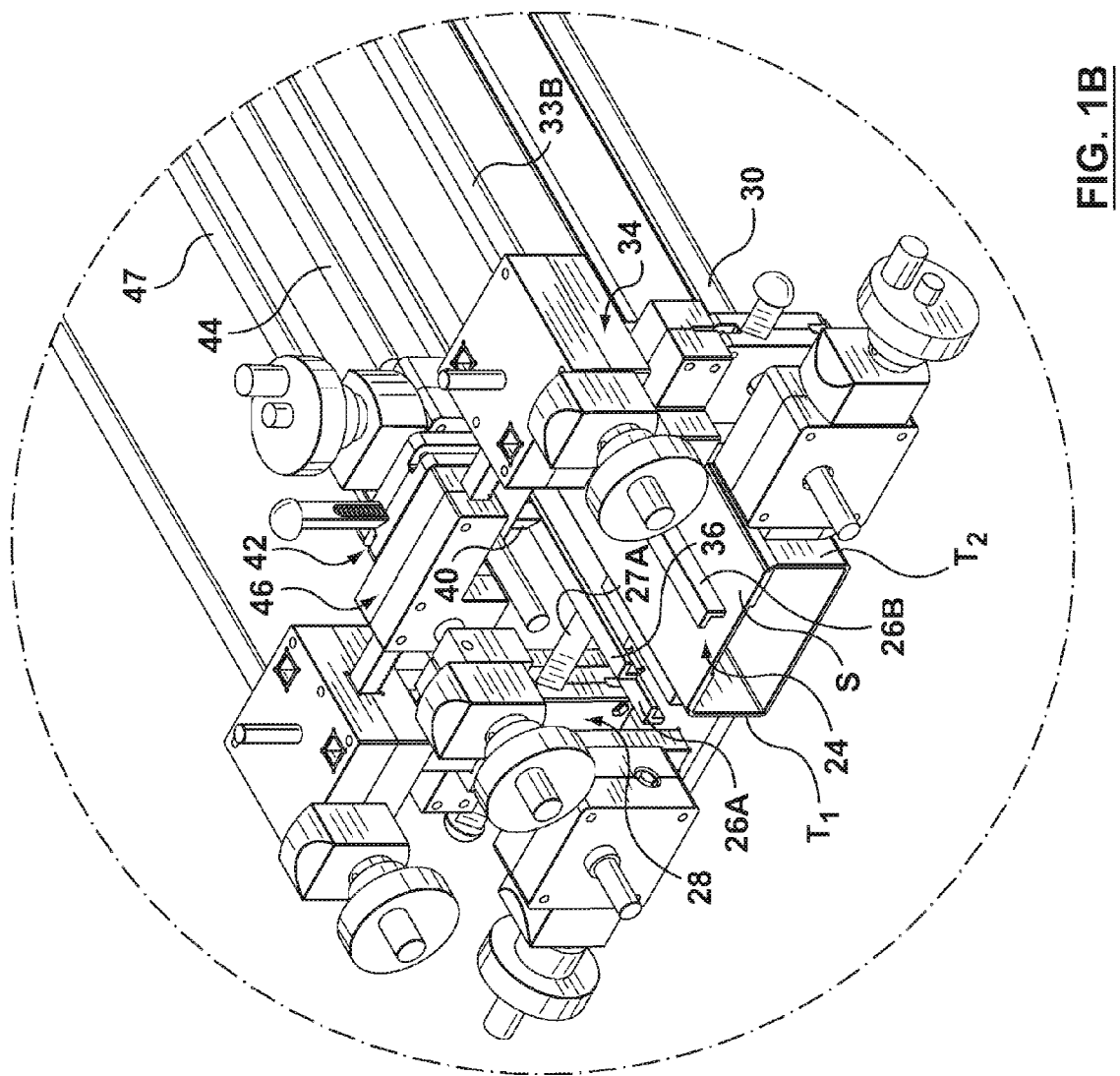
FIG. 1B is an isometric view of a module of the guide rail system of FIG. 1A, drawn at a larger scale.
Figure 1C:
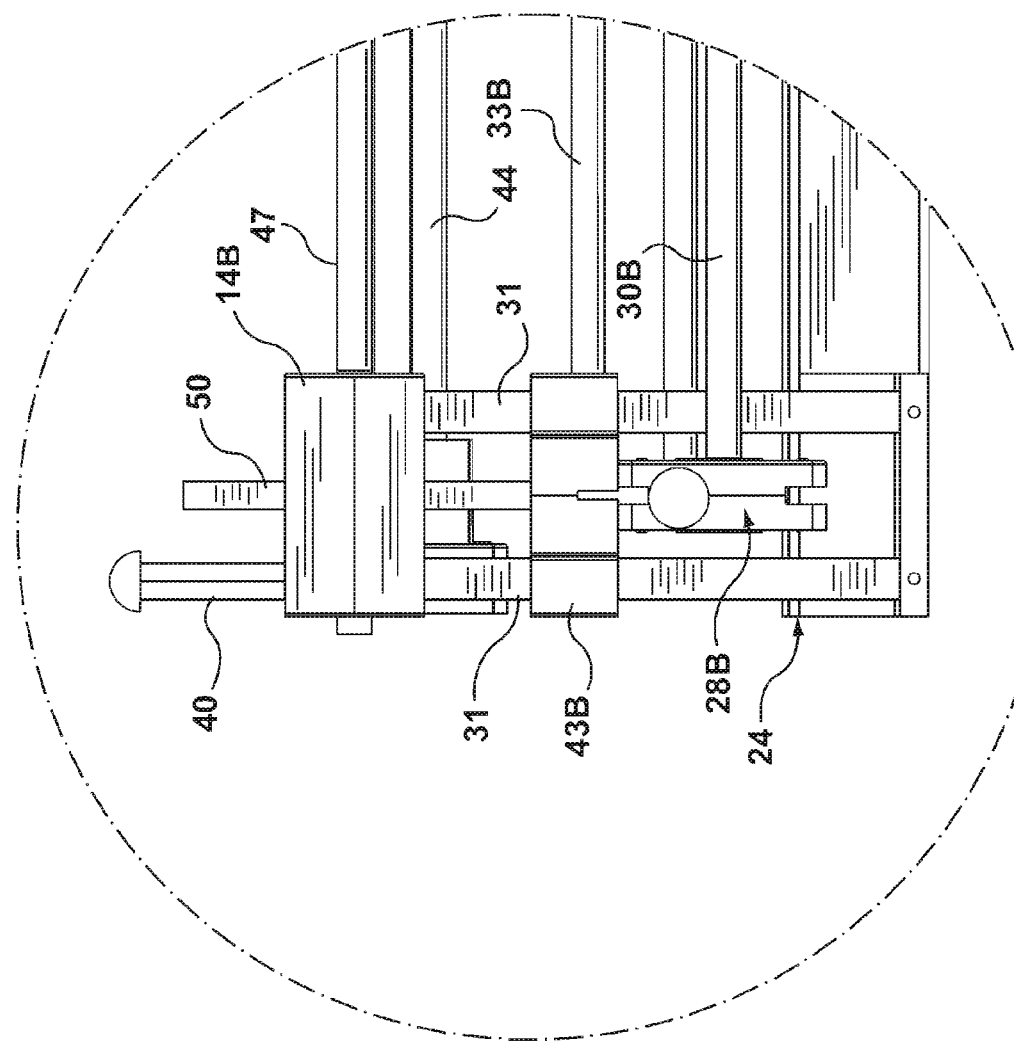
FIG. 1C is a side view of another module of the guide rail system of FIG. 1A.

In the attached drawings, like reference numerals designate corresponding elements throughout. Reference is first made to FIGS. 1A-2C to describe an embodiment of a guide rail system in accordance with the invention indicated generally by the numeral 20. The guide rail system 20 is for guiding containers 22 on one or more conveyors 24 (FIG. 1E) on which the containers 22 are moved. In one embodiment, the guide rail system 20 preferably includes a number of first and second contact portions 26A, 26B (FIG. 1B), for engaging the containers 22, to at least partially locate the containers 22 in preselected positions on one or more surfaces "S" on the conveyor 24 relative to a center line "X" of the conveyor 24 (FIG. 1D), as will be described. The center line X is located substantially equidistant from opposing first and second sides "$T_1$", "$T_2$" of the conveyor 24 (FIG. 1E). It is also preferred that the guide rail system 20 includes a number of first and second adjustment elements 27A, 27B (FIG. 1E) positioned proximal to the first and second sides $T_1$, $T_2$ respectively, the first and second contact portions 26A, 26B being mounted on the first and second adjustment elements 27A, 27B respectively (FIG. 1E). Preferably, the guide rail system 20 also includes a number of first and second adjustable point devices 28A, 28B spaced apart from each other along the first and second sides $T_1$, $T_2$ respectively. It is preferred that the first and second adjustment elements 27A, 27B are mounted in the first and second adjustable point devices 28A, 28B respectively and are transversely movable thereby relative to the center line X for positioning the first and second contact portions 26A, 26B in predetermined locations therefor relative to the center line X for engagement thereby with the containers 22 as the containers 22 are moved past the first and second contact portions 26A, 26B by the conveyor 24, to at least partially locate the containers in the preselected positions therefor. In addition, the guide rail system 20 preferably includes one or more height adjustment assemblies 29A, 29B (FIG. 1E) for positioning side contact portions 26 selected from the group consisting of the first contact portions 26A, the second contact portions 26B, and the first and second contact portions 26A, 26B in the predetermined locations therefor (heightwise), relative to the surface S of the conveyor 24.

In another embodiment, the guide rail system 20 preferably includes first and second drive elements 30A, 30B rotatable about first and second rotation axes 32A, 32B thereof respectively. Preferably, the first and second drive elements 30A, 30B are operably connected to the first and second adjustable point devices 28A, 28B respectively, for effecting substantially uniform movement of the first adjustment elements 27A transversely relative to the center line X upon rotation of the first drive element 30A about the first rotation axis 32A, and for effecting substantially uniform movement of the second adjustment elements 27B transversely relative to the center line X upon rotation of the second drive element 30N about the second rotation axis 32B.

Figure 1D:
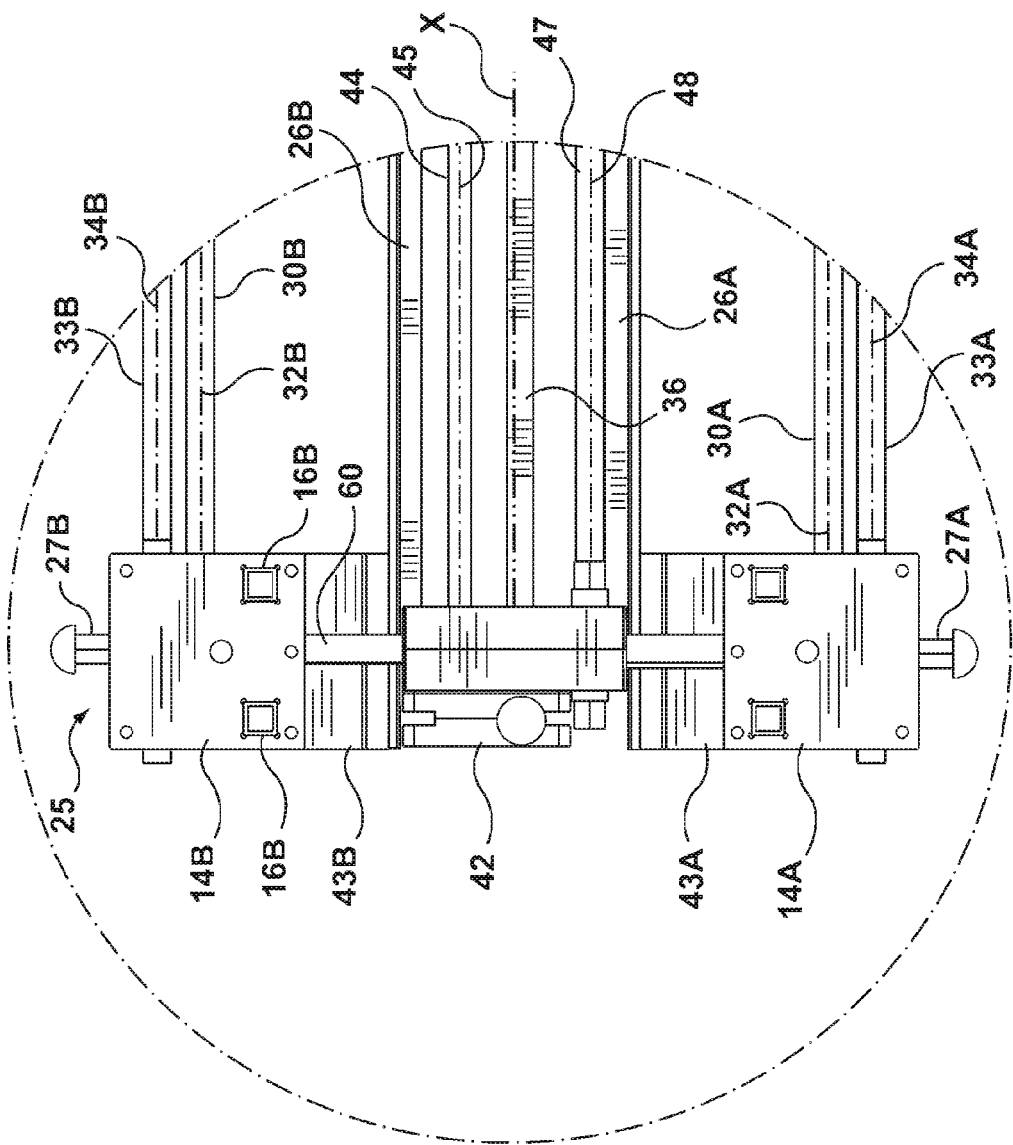
FIG. 1D is a plan view of the module of FIG. 1C.
Figure 1E:
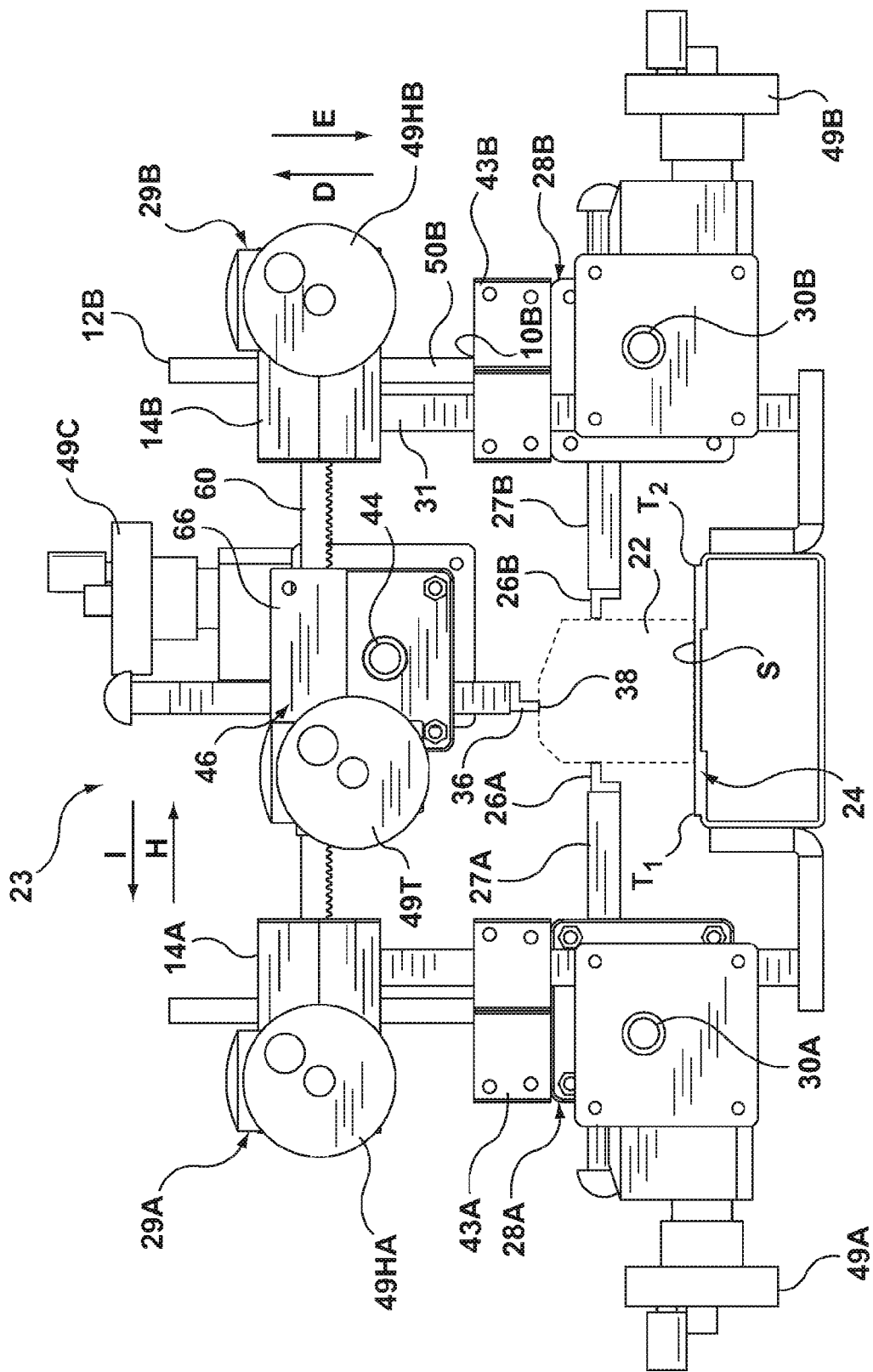
FIG. 1E is a first side view of the module of FIG. 1B.

It is also preferred that a guide rail system 20 additionally includes one or more height adjustment drive elements 33A, 33B, each being rotatable about respective height adjustment rotation axes 34A, 34B (FIG. 1D). Preferably, each of the height adjustment drive elements 33A, 33B is operably connected to the height adjustment assemblies 29A, 29B respectively for effecting substantially uniform movement of the side contact portions 26A, 26B respectively positionable by the height adjustment assemblies 29A, 29B relative to the surface S, upon rotation of the height adjustment drive elements 33A, 33B about the respective height adjustment rotation axes 34A, 34B.

In another embodiment, the guide rail system 20 preferably includes a number of central contact portions 36 (FIG. 1B), for engaging preselected parts 38 on the containers 22 (FIG. 1E), to at least partially locate the containers 22 in the preselected positions on the surface S of the conveyor 24 relative to the center line X. Preferably, the guide rail system 20 includes one or more central adjustment elements 40. The central contact portions 36 preferably are mounted on the central adjustment elements 40 respectively (FIG. 1B). It is also preferred that the guide rail system 20 includes a number of central adjustable point devices 42 spaced apart from each other along the conveyor 24 between the first and second sides $T_1$, $T_2$, the central adjustment elements 40 being mounted in the central adjustable point devices 42 respectively. The central adjustment elements 40 preferably are movable thereby relative to the surface S for positioning the central contact portions 36 for engagement with the preselected parts 38 of the containers 22, as the containers 22 are moved past the central contact portions 36 by the conveyor 24, to at least partially locate the containers in the preselected positions therefor.

As can be seen in FIGS. 1A-1F, it is also preferred that the guide rail system 20 includes one or more central drive elements 44 rotatable about a central drive element axis 45 thereof. Preferably, the central drive element 44 is operably connected to the central adjustable point devices 42, for substantially uniform movement of the central contact portions 36 upon rotation of the central drive element 44 about the central drive element axis 45.

As illustrated in FIGS. 1B and 1E, the guide rail system 20 preferably also includes one or more transverse adjustment assemblies 46 for moving the central adjustable point devices 42 transversely relative to the center line X, for positioning the central contact portions 36 respectively for engagement with the preselected parts 38 of the containers 22 as the containers 22 are moved past the central contact portions 36 by the conveyor 24 to at least partially locate the containers in the preselected positions therefor, as will also be described. Preferably, the transverse adjustment assemblies 46 are spaced apart from each other along the conveyor 24.

It is also preferred that the guide rail system 20 includes one or more transverse assembly drive elements 47, each rotatable about a transverse assembly drive element axis 48. Preferably, the transverse drive element 47 is operably connected to the transverse adjustment assemblies 46, for substantially uniform transverse movement of the central adjustable point devices 42 relative to the center line X of the conveyor 24 upon rotation of the transverse assembly drive element 47 about its axis 48.

It will be understood that the guide rail system may be used with any suitable conveyor. For example, the conveyor may be positioned so that the view of the module provided in FIG. 1D may be an orthogonal top view or an orthogonal bottom view. For the purposes hereof, the description and the drawings refer to and show the conveyor(s) 24 as generally positioned so that the containers are positioned on the surface S at least partially due to gravity, i.e., the surface S is shown facing upwardly. However, it will be understood that the invention as disclosed herein may be used with conveyors having any orientation.

Also, those skilled in the art will appreciate that the system of the invention is not necessarily installed in a substantially horizontal position, e.g., the system may be used where the conveyor(s) are at an angle to the horizontal, to ramp from one elevation to another. Accordingly, references herein to a "height adjustment" do not necessarily refer to vertical movement, but refer to movement generally up or down relative to the conveyor, i.e., relative to the surface S of the conveyor. Also, because the conveyor may not be positioned horizontally (i.e., lengthwise, or crosswise), references herein are to transverse movement relative to the conveyor, rather than "horizontal" movement relative to the center line of the conveyor. For the purposes hereof, "transverse", in relation to a conveyor, refers to a direction of movement which would ultimately cross a longitudinal axis of the conveyor, not necessarily orthogonally.

Figure 1F:
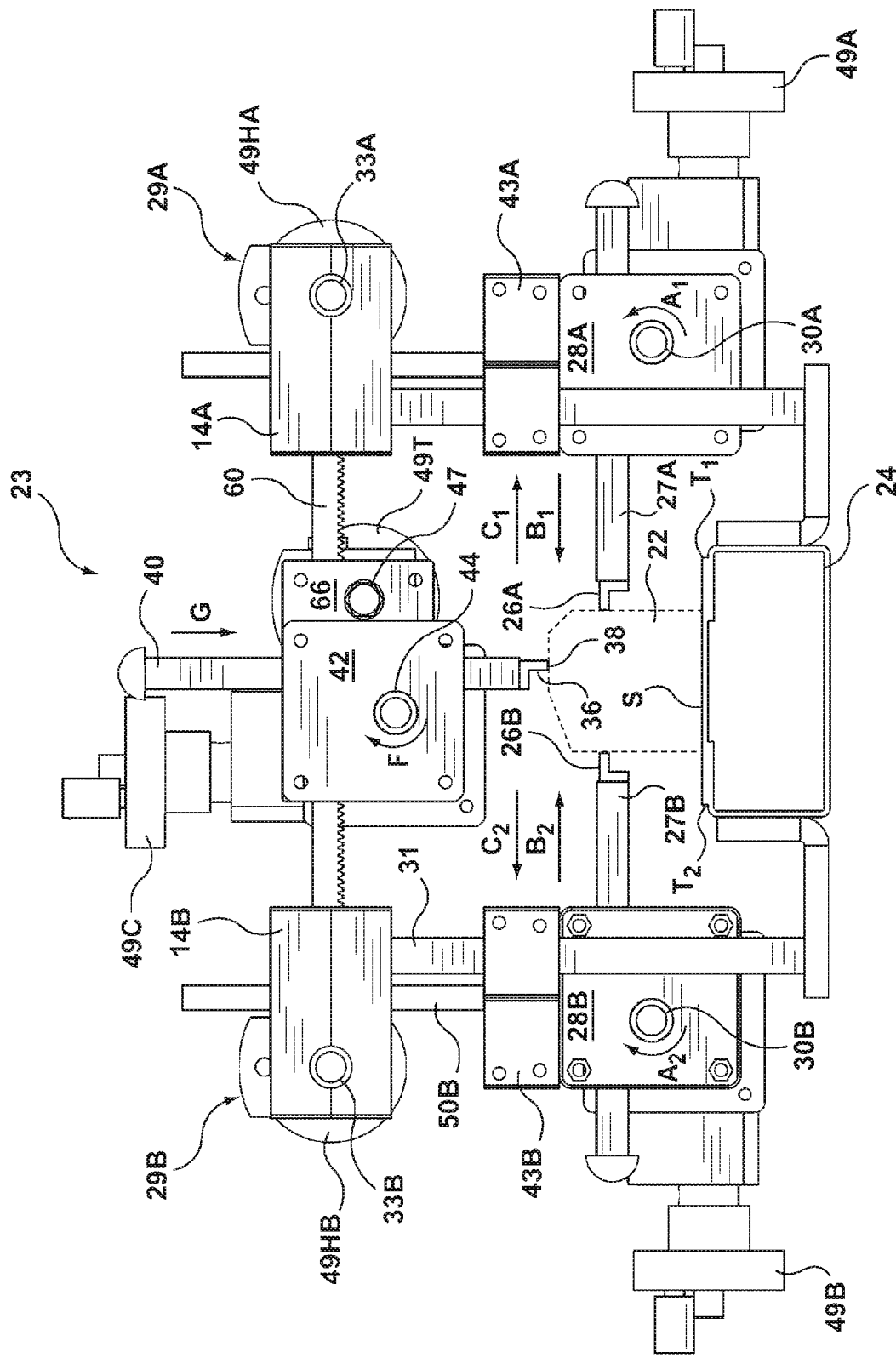
FIG. 1F is a second side view of the module of FIG. 1B.

The container 22 is shown in the preselected position therefor on the conveyor 24 in FIGS. 1E and 1F. In FIG. 1E, the adjustable point devices are identified as 28A and 28B respectively, and the two contact portions of the adjustable point devices 28A, 28B are identified as 26A, 26B respectively. As illustrated in FIG. 1E, when the contact portions 26A, 26B are in the predetermined locations therefor relative to the conveyor 24, they engage the container 22, locating the container 22 in the preselected position therefor. Preferably, the contact portions are conventional guide rails. As will be described, the contact portions may also include conventional caps (or sheaths) positioned on the guide rails. Preferably, the contact portions 26A, 26B slidingly engage the containers 22, as the containers 22 are moved past the contact portions 26A, 26B. It is preferred that the movement of the containers 22 on the conveyor 24 should be relatively smooth, i.e., the containers 22 are subjected to minimal bumping.

As can be seen in FIGS. 1A-1D, in one embodiment, the system 20 preferably includes a number of modules 23, each module 23 preferably including the first and second adjustable point devices 28A, 28B and the central adjustable point device 42, as well as a number of other elements described below. Arranging elements in the modules 23 tends to simplify construction, and also simplifies operation of the guide rail systems. As can be seen in FIGS. 1A and 1E, for instance, the adjustable point devices 28A, 28B, the central adjustable point device 42, and other elements are controlled via handwheels located at the module 23. However, the guide rail system 20 preferably also includes secondary modules 25 (FIG. 1D). In FIG. 1A, for clarity of illustration, the secondary modules are identified as 25-1, 25-2, 25-3, and 25-4. As shown in FIG. 1A, the drive elements preferably extend from the module 23 to the secondary modules 25. It will be appreciated by those skilled in the art that an operator (not shown) located at the module 23 can, by operation of the handwheels of that module, effect corresponding uniform movement, in unison, of corresponding adjustment elements at the secondary modules 25.

Those skilled in the art will appreciate that the drive elements may be rotated by any suitable means. For example, the drive elements may be rotated by suitably controlled stepper motors, rather than manually, i.e., via handwheels.

It will be understood that the arrangement of the module 23 and the secondary modules 25 illustrated in FIG. 1A is only one example of the arrangements possible. Those skilled in the art will appreciate that the locations and spacing of the modules 23 and the secondary modules 25 for any particular conveyor(s) would depend on a number of factors specific to the installation.

Also, those skilled in the art will appreciate that although reference is made herein to a "drive element", in each case, the drive element extending between the module 25 and the secondary module may be made up of a number of individual parts or segments secured to each other and/or adjustable point devices to provide a unitary drive element, rotatable about its axis along the length of the conveyor(s) 24. Those skilled in the art would be aware of suitable rods or other materials which may be used as the drive elements. There may be practical constraints on the length of a particular drive element rod or part. For instance, it may be preferred that a particular physical drive element end is positioned at a particular module to which an end thereof is fastened, and that another physical drive element be fastened to the appropriate elements in the module.

For clarity of illustration, the drive elements and guide rails extending to and from the module 25 are shown only on the right-hand sides of the drawings, in each of FIGS. 1C and 1D. It will be understood that, although omitted from FIGS. 1C and 1D, the drive elements and guide rails (and conveyor) may also extend from (and to) the left-hand side of the module 25 as presented in FIGS. 1C and 1D.

The module 23 is illustrated in FIGS. 1E and 1F, in which the two adjustable point devices are identified as 28A, 28B for clarity. It will be understood that FIGS. 1E and 1F are views of opposite sides (e.g., "front" and "back") of the module 23. The module 23 preferably includes guide portions 43A, 43B mounted on top of (and secured to) the adjustable point devices 28A, 28B respectively, as will be described. As illustrated in FIG. 1E, the module 23 preferably also includes the height adjustment subassemblies 34A, 34B for respectively positioning the contact portions 26A, 26B in the respective predetermined locations therefor, relatively to the surface S of the conveyor 24.

As indicated above, in one embodiment, rotational movement of the drive elements preferably is controlled by handwheels. Preferably, the handwheels are operably connected to the drive elements by appropriate gears in each case, using conventional gears. For instance, handwheels 49A and 49B preferably are operably connected with drive elements 30A, 30B. As can be seen in FIG. 1E, rotation of the handwheels 49A and 49B causes rotation of the drive elements 30A, 30B, which results in substantially transverse movement of the adjustment elements 27A, 27B relative to the conveyor 24, for locating the contact portions 26A, 26B in the predetermined locations therefor. The manner in which the drive elements are connected to the adjustment elements (i.e., via pinions, in rack and pinion arrangements) is described in U.S. patent application Ser. No. 12/897,418, filed Oct. 4, 2010 (such patent application being incorporated herein in its entirety by reference), and therefore it is not necessary to describe in detail the manner in which rotation of the drive elements about their respective rotation axes results in movement of the adjustment elements. As shown in FIG. 1F, for instance, rotation of the drive elements 30A, 30B in the directions indicated by arrows "$A_1$" and "$A_2$" respectively results in substantially transverse movement of the adjustment elements 27A, 27B respectively in the directions indicated by arrows "$B_1$" and "$B_2$". It will be understood that rotation of the drive elements 30A, 30B in directions opposite to those indicated by arrows $A_1$ and $A_2$ respectively results in substantially transverse movement of the adjustment elements 27A, 27B respectively in the directions indicated in FIG. 1F by arrows "$C_1$" and "$C_2$".

To simplify the description, only the height adjustment assembly 29B is described in detail herein. It will be understood that the height adjustment assembly 29A is the same as the height adjustment subassembly 29B, in all material respects. For clarity of illustration, many components of the height adjustment assembly 29A are omitted from the drawings.

The height adjustment subassembly 29B is described with reference in particular to FIGS. 1E, 1F, and 2A. The height adjustment assembly 29B preferably includes two substantially vertical guide rails 31. In one embodiment, it is preferred that the guide portion 43B includes apertures 35B in which the rails 31 are slidably received (FIG. 2A).

Preferably, the height adjustment assembly 29B also includes a rod 50B, which is externally threaded. As can be seen, for instance, in FIG. 1E, the rod 50B extends between a lower end 10B and an upper end 12B. (The external threads on the rods 50A, 50B are omitted for clarity of illustration except for some of the threads on the rod 50B, which are illustrated, to a limited extent only, in FIG. 2A. It will be understood that the external threads on the rod 50B preferably extend continuously, i.e., substantially between the lower and upper ends thereof.) The rod 50B is fixed to the guide portion 43B at the lower end 10B of the rod 50B. The guide portion 43B is secured to the adjustable point device 28B. As can be seen, for instance, in FIGS. 1E and 1F, the rod 50B extends through a height subassembly gearbox 14B. (It will be understood that a number of elements, including the gearbox 14B, are omitted from FIGS. 2A-2C for clarity of illustration.) At upper ends 16B thereof, the guide rails 31 are secured to the gearbox 14B. The guide rails 31 and the gearbox 14B are stationary relative to the conveyor 24.

Figure 2A:
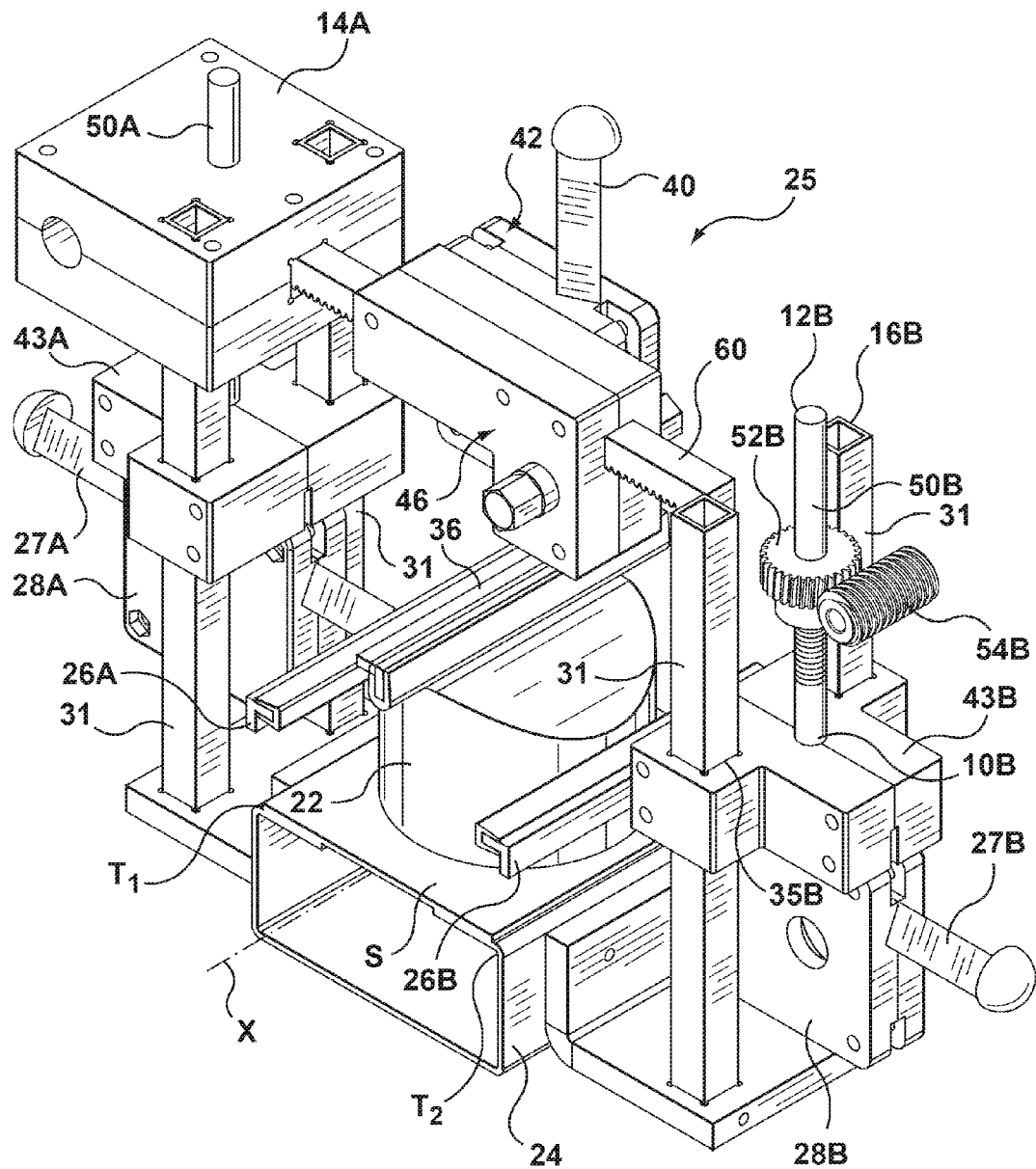
FIG. 2A is an isometric view the module of FIGS. 1C and 1D, with certain elements thereof omitted.
Figure 2B:
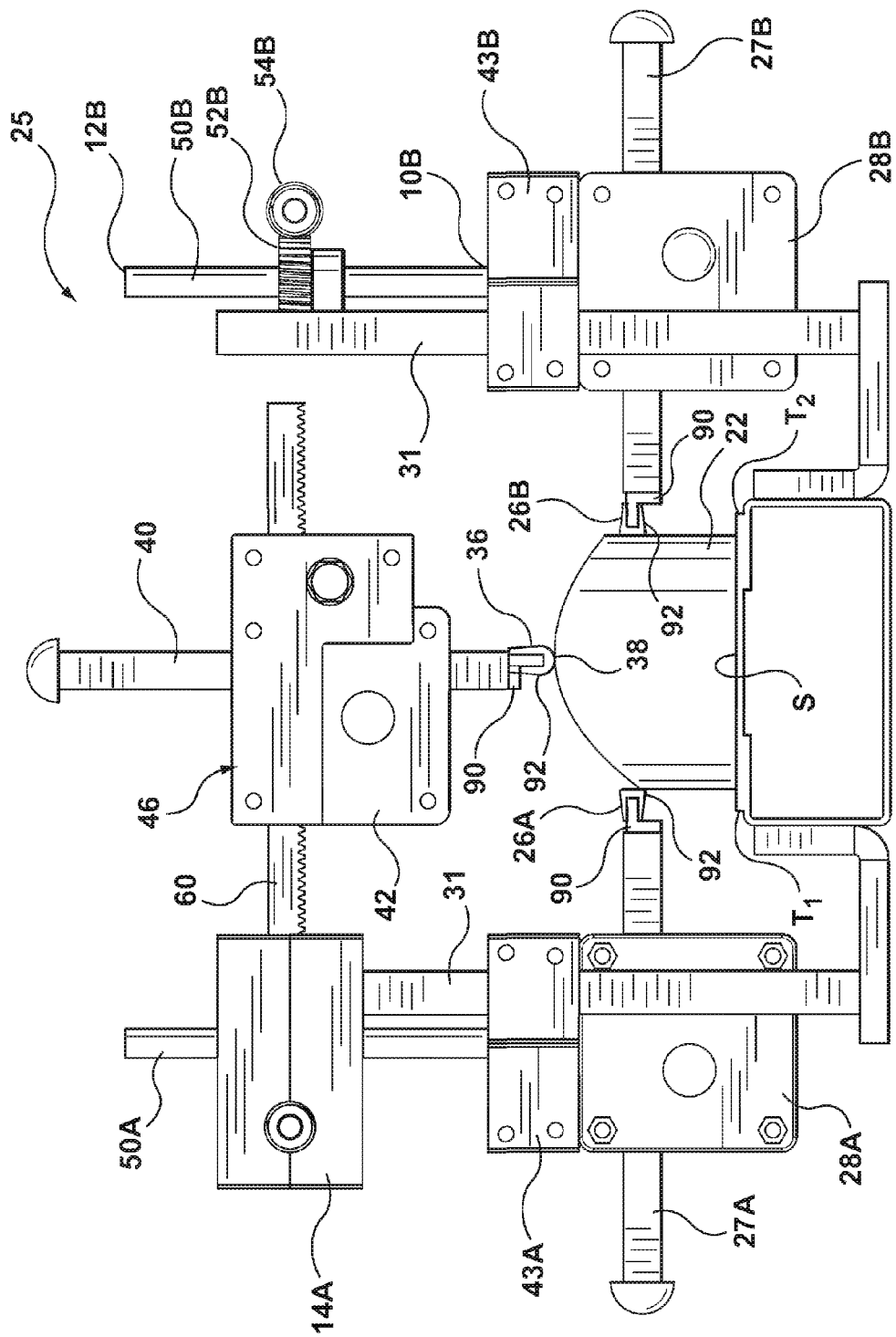
FIG. 2B is a first side view of the module of FIG. 2A.
Figure 2C:
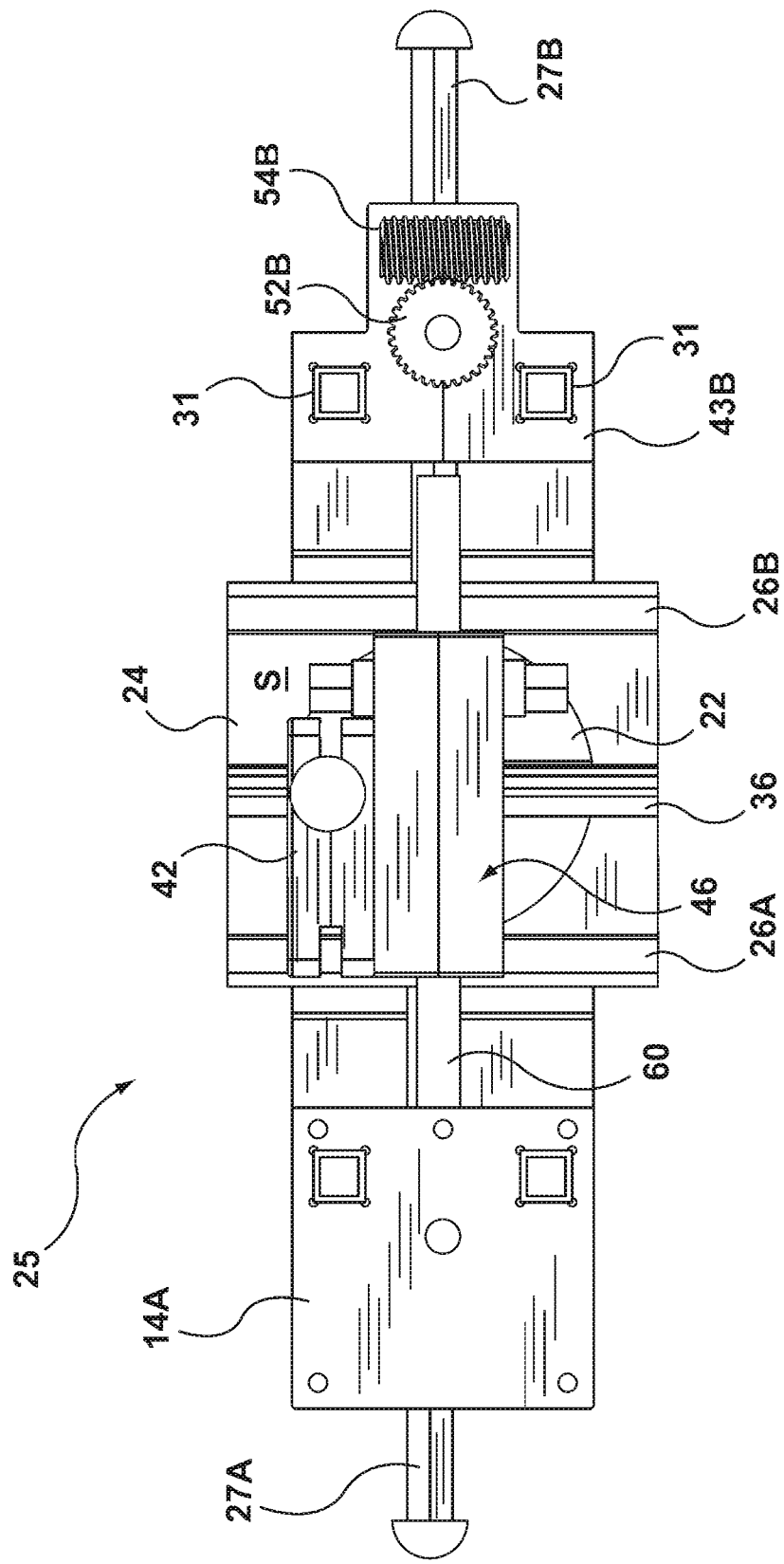
FIG. 2C is a plan view of the module of FIG. 2A.

Preferably, and as can be seen in FIGS. 2A-2C, the height adjustment assembly 29B includes a gear 52B which is engaged with a worm gear 54B, both of which are mounted inside the gearbox 14B. The gear 52B preferably is tapped in its internal diameter. It will be understood that the rod 50B is threadably engaged with the gear 52B, i.e., the rod 50B is engaged with the threads in the internal diameter of the gear 52B (FIG. 2A).

It is also preferred that the worm gear 54B preferably is mounted on the height adjustment drive element 33B (FIG. 1F). (For clarity of illustration, the drive element 33B is omitted from FIG. 2A.) Accordingly, rotation of the drive element 33B causes the worm gear 54B to rotate, which in turn causes the gear 52B to rotate about the rod 50B, with which such gear 52B is threadably engaged. However, because the rod 50B is secured to the guide portion 43B (and thus indirectly secured to the adjustable point device 28B) and the gear 52B is mounted in the stationary height assembly gearbox 14B, the rotation of the gear 52B relative to the rod 50B causes the rod 50B to be moved up (i.e., in the direction indicated by arrow "D" in FIG. 1E) or down (i.e., in the direction indicated by arrow "E" in FIG. 1E), relative to the gear 52B, as the case may be. Because the rod 50B is secured to the guide portion 43B at its bottom end 10B, such heightwise movement of the rod 50B (in relation to the surface S of the conveyor 24) causes corresponding heightwise movement of the guide portion 43B. Accordingly, such movement of the rod 50B relative to the gearbox 14B (i.e., and also relative to the surface S of the conveyor 24) results in corresponding movement up or down, as the case may be (i.e., heightwise adjustment, relative to the surface S of the conveyor 24) of the adjustable point device 28B. Because the adjustment element 27B is mounted in the adjustable point device 28B for movement transverse to the center line X, the heightwise adjustment of the adjustable point device 28B also moves the adjustment element 27B (and the contact portion 26B mounted on the adjustment element 27B) relative to the surface S of the conveyor. Accordingly, the contact portion 26B is positionable by the height adjustment assembly 29B in the predetermined location therefor relative to the surface S, i.e., for a particular container 22.

It will be understood, based on the foregoing description and the drawings, that the height adjustment subassembly 29A includes elements corresponding to, and similar to, the elements of the height adjustment subassembly 29B in all material respects. Those skilled in the art will appreciate that the height adjustment subassemblies 29B positioned along the second side of the conveyor 24, preferably are utilized for height adjustment substantially in unison (i.e., substantially simultaneous, substantially uniform movement), when movement is initiated by rotation of the drive element 33B. Also, it will be understood that the height adjustment assemblies 29A positioned along the first side are also operable substantially in unison. Those skilled in the art will appreciate that, depending on the container 22, the contact portions 26A, 26B may not be positioned at the same location heightwise relative to the surface S. As can be seen in FIG. 1E, in one embodiment, it is preferred that movement of the drive elements 33A, 33B is controlled by handwheels 49HA and 49HB.

Preferably, and as can be seen in FIGS. 1E and 1F, a handwheel 49C is mounted for use with the central adjustable point device 42. As illustrated in FIGS. 1E and 1F, rotation of the handwheel 49C causes rotation of the central drive element 44, which results in movement (i.e., heightwise adjustment) of the central adjustment element 40 relative to the surface S of the conveyor 24, for locating the central contact portion 36 in the predetermined central location therefor. Those skilled in the art will appreciate that the preselected parts 38 of the container 22 may vary significantly. Also, the central contact portion 36 may have any suitable configuration, depending on the container 22. The preselected part 28 may be, for instance, a closure. It will be understood that the predetermined location of the central contact portion 36 preferably is determined relative to the center line X, as well as relative to the surface S.

The manner in which the central drive element 44 is operatively connected to the central adjustment element 40 (i.e., via a pinion (not shown), in a rack and pinion arrangement in which the central adjustment element 40 is the rack) is described in U.S. patent application Ser. No. 12/897,418, filed Oct. 4, 2010 (referred to above), and therefore it is not necessary to describe in detail the manner in which rotation of the central drive element 44 results in movement of the central adjustment element 42. As shown in FIG. 1F, for instance, rotation of the central drive element 44 in the direction indicated by arrow "F" results in heightwise movement of the central adjustment element 40 relative to the surface S, in the direction indicated by arrow "G". It will be understood that rotation of the central drive element 44 in the direction opposite to that indicated by arrow F results in movement of the central adjustment element 40 in the direction opposite to that indicated by arrow G.

As can be seen in FIG. 1F, the transverse adjustment assembly 46 preferably includes a rack 60 and a pinion (not shown). The pinion preferably is mounted on the transverse assembly drive element 47 (FIG. 1E). In one embodiment, the pinion preferably is also mounted inside a transverse adjustment subassembly housing 66, and the housing 66 is secured to the central adjustable point device 40. As conventional rack and pinion arrangements are known to those skilled in the art, further description of the engagement of the rack and the pinion in the housing 66 is not required. It can be seen in FIGS. 1E, 1F, and 2A that the rack 60 is supported at its ends by the gearboxes 14A, 14B, and maintained in a substantially stationary position relative to the gearboxes 14A, 14B. Accordingly, the rack 60 is stationary relative to the conveyor 24.

When the transverse assembly drive element 47 is rotated, the consequent rotation of the pinion causes movement of the pinion along the rack 60, i.e., in one of the directions indicated by arrows "H" and "I" in FIG. 1E. Because the pinion is mounted in the housing 66, and because the housing 66 is secured to the central adjustable point device 42, movement of the pinion along the rack 60 results in consequent movement of the central adjustable point device 42 in the direction indicated by arrows H or I, i.e., such movement is transverse relative to the center line X.

As noted above, the central adjustment element 40 is mounted in the central adjustable point device 42, and the central contact portion 36 is mounted on the central adjustment element 40. Accordingly, it can be seen that the transfer adjustment assembly 46 is useable to quickly position the central contact portion 36 relative to the center line X as required for engagement thereof with the preselected parts of the containers 22. Also, because transverse adjustment assemblies 46 positioned along the conveyor 24 are operatively connected to the transverse assembly drive element 47, rotation of the drive element 47 about the transverse assembly drive element axis 48 (FIG. 1D) effects substantially uniform transverse movement of the central adjustable point devices. As can be seen in FIGS. 1E and 1F, the module 23 preferably includes a handwheel 49T that is operably connected to the transverse assembly drive element 47, for controlling rotation of the transverse assembly drive element 47 about the transverse assembly drive element axis 48.

As can be seen, e.g., in FIG. 2B, in one embodiment, the contact portions 26A, 26B, 36 preferably include a guide rail 90 and a sheath 92 at least partially covering the guide rail 90. The guide rail 90 may have any suitable shape (i.e., suitable for the containers which it is to engage, and/or the sheath 92), and is secured to the adjustment elements 27A, 27B, 40 by any suitable means. For instance, the conventional guide rail 90 may be provided in the form of elongate segments of angle iron, as shown, for instance, in FIG. 2B.

Those skilled in the art will appreciate that the conventional guide rail 90 may, in some circumstances, not be appropriate, e.g., if the guide rail 90 might scratch the containers. This may be a problem, for instance, where the containers are glass. In such circumstances, the sheath or covering 92, made of a suitably soft material, is positioned on the guide rail 90, as shown in FIG. 2B. The sheath 92 preferably has any suitable shape and is made of any suitable material, e.g., a suitable polyethylene.

From the foregoing, it can be seen that the guide rail system 20 of the invention provides a means for easy and rapid adjustment of the contact portions (i.e., the guide rails). In use, when an adjustment to positions of guide rails is required (e.g., due to a container having a shape and/or size which differ from those of the container for which the guide rails were positioned), the positions of the guide rails may be adjusted quickly, and accurately. The guide rail system 20 can accommodate a wide variety of containers.

It will be understood that, in addition to the arrangements described above, alternative arrangements are included in the guide rail system 20 of the invention. For instance, in one alternative embodiment, the guide rail system 20 may include contact surfaces positioned for engaging sides of the containers that are not transversely movable relative to the center line X, i.e., transversely fixed contact portions. For instance, the guide rail system 20 may include one or more movable (i.e., transversely movable, as described above) contact portions, positioned along only the first or the second side of the conveyor(s) 24. In this situation, the transversely fixed contact portions are positioned along the other side of the conveyor(s) 24. Either or both of the side contact portions positioned along the first and second sides may be movable heightwise relative to the surface S of the conveyor, by one or more height adjustment assemblies, as described above.

In another alternative embodiment, the guide rail system 20 may include side contact portions positioned along both sides of the conveyor(s) that are transversely fixed. In this situation, the side contact portions on either or both sides may be moved heightwise relative to the surface S by one or more height adjustment assemblies, as described above.

In another alternative embodiment, the guide rail system 20 may include center adjustable point devices, and the transverse adjustment assemblies, with contact portions positioned for engaging the sides of the containers that are, on both sides of the conveyor(s), transversely fixed. Alternatively, the side contact portions positioned along only one side of the conveyor(s) may be transversely fixed, with the side portions along the other side being transversely movable, as described above. One or more heightwise adjustment assemblies may be included.

Figure 3A:
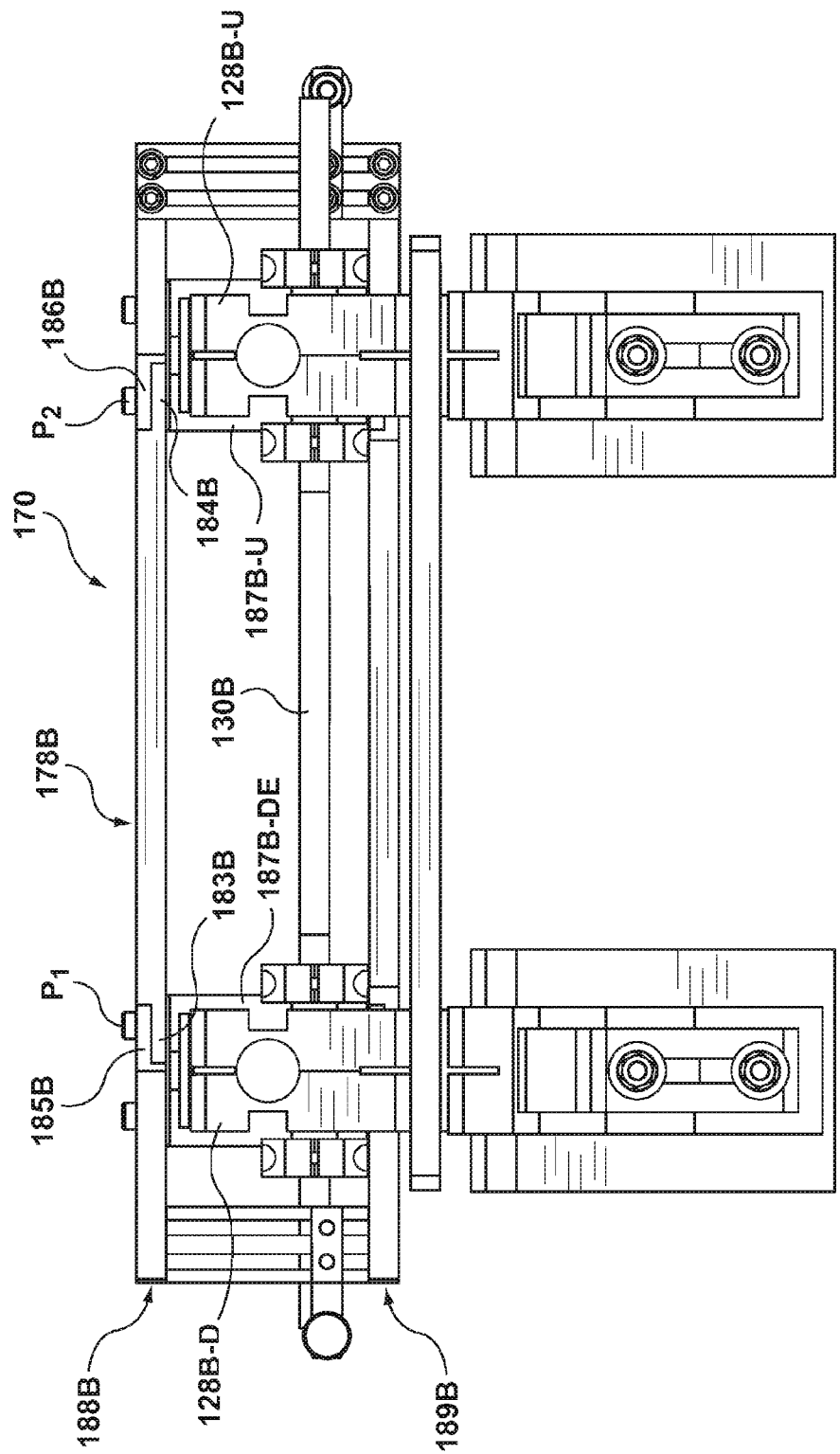
FIG. 3A is a side view of an embodiment of a centering device of the invention, drawn at a larger scale.
Figure 3B:
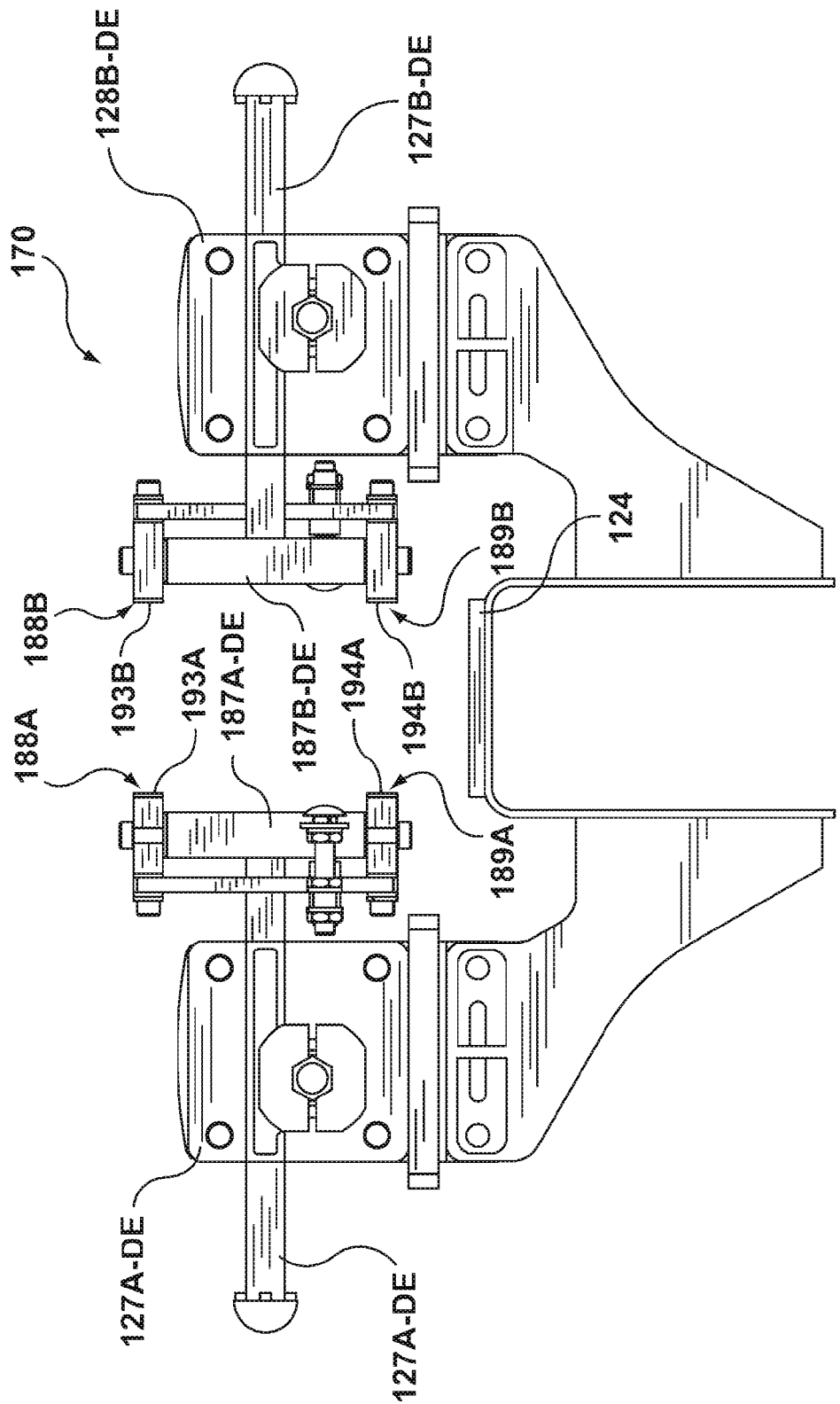
FIG. 3B is an end view of the centering device of FIG. 3A.
Figure 3C:
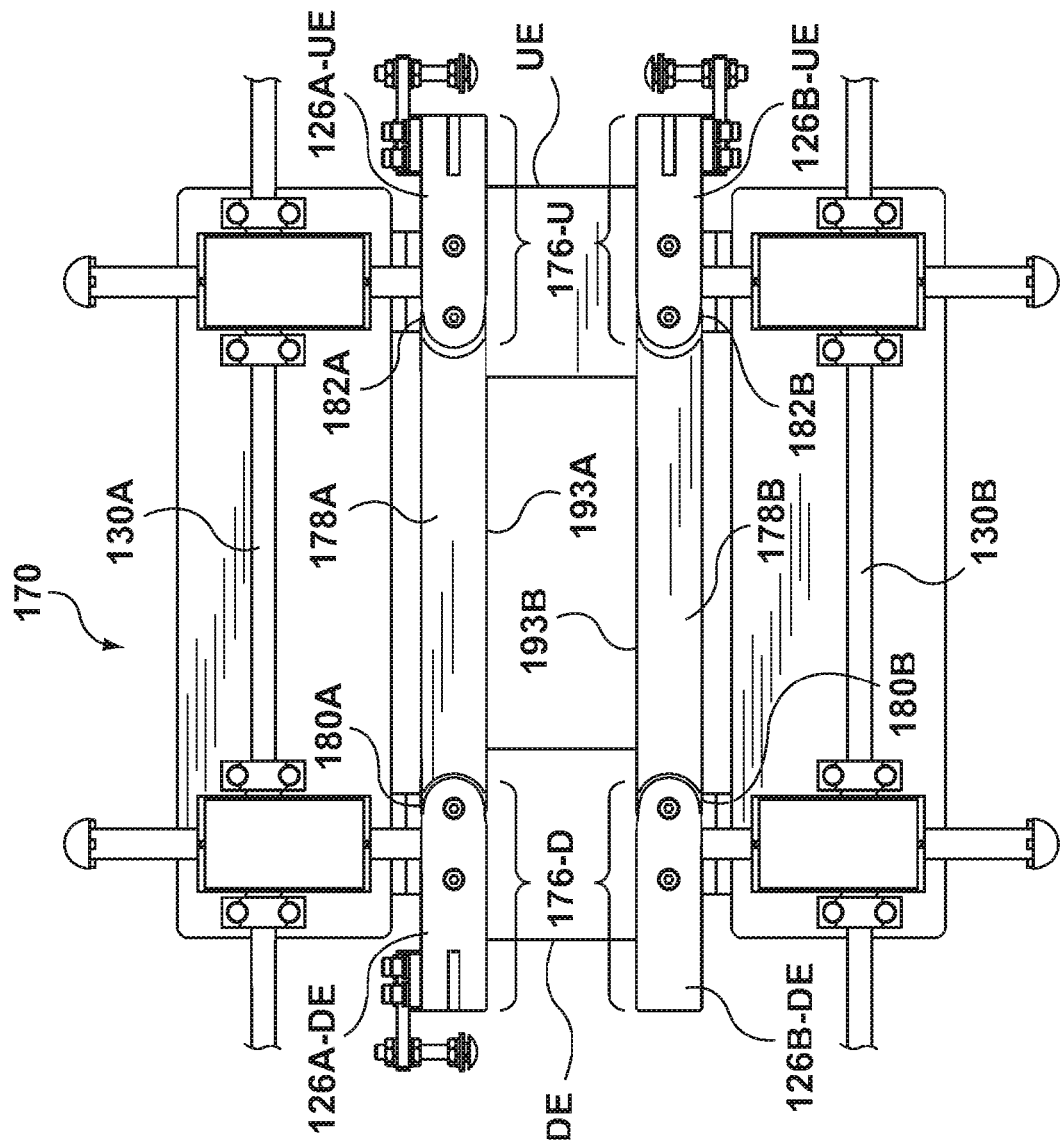
FIG. 3C is a plan view of the centering device of FIG. 3A.
Figure 3D:
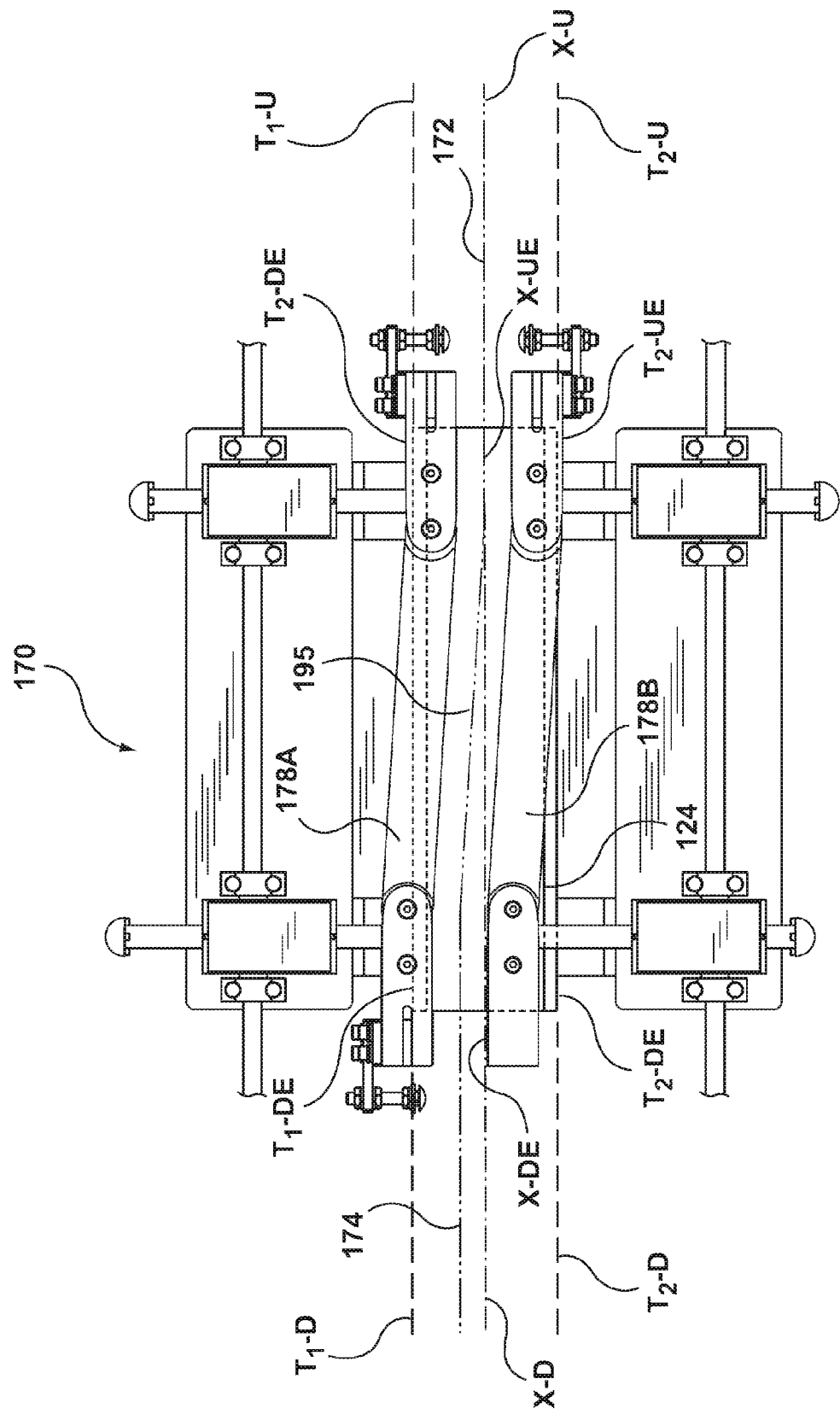
FIG. 3D is another plan view of the centering device of FIG. 3A, with a conveyor also outlined therein.

An alternative embodiment of the guide rail system 120 of the invention is illustrated in FIGS. 3A-3D. The guide rail system 120 preferably includes a centering device 170. As will be described, the centering device 170 is for shifting containers on one or more conveyors 124 from a first (upstream) container path 172 to a second (downstream) container path 174 (FIG. 3D). The direction of travel of the containers is indicated by arrow "J" in FIGS. 3D and 3E.

Figure 3E:
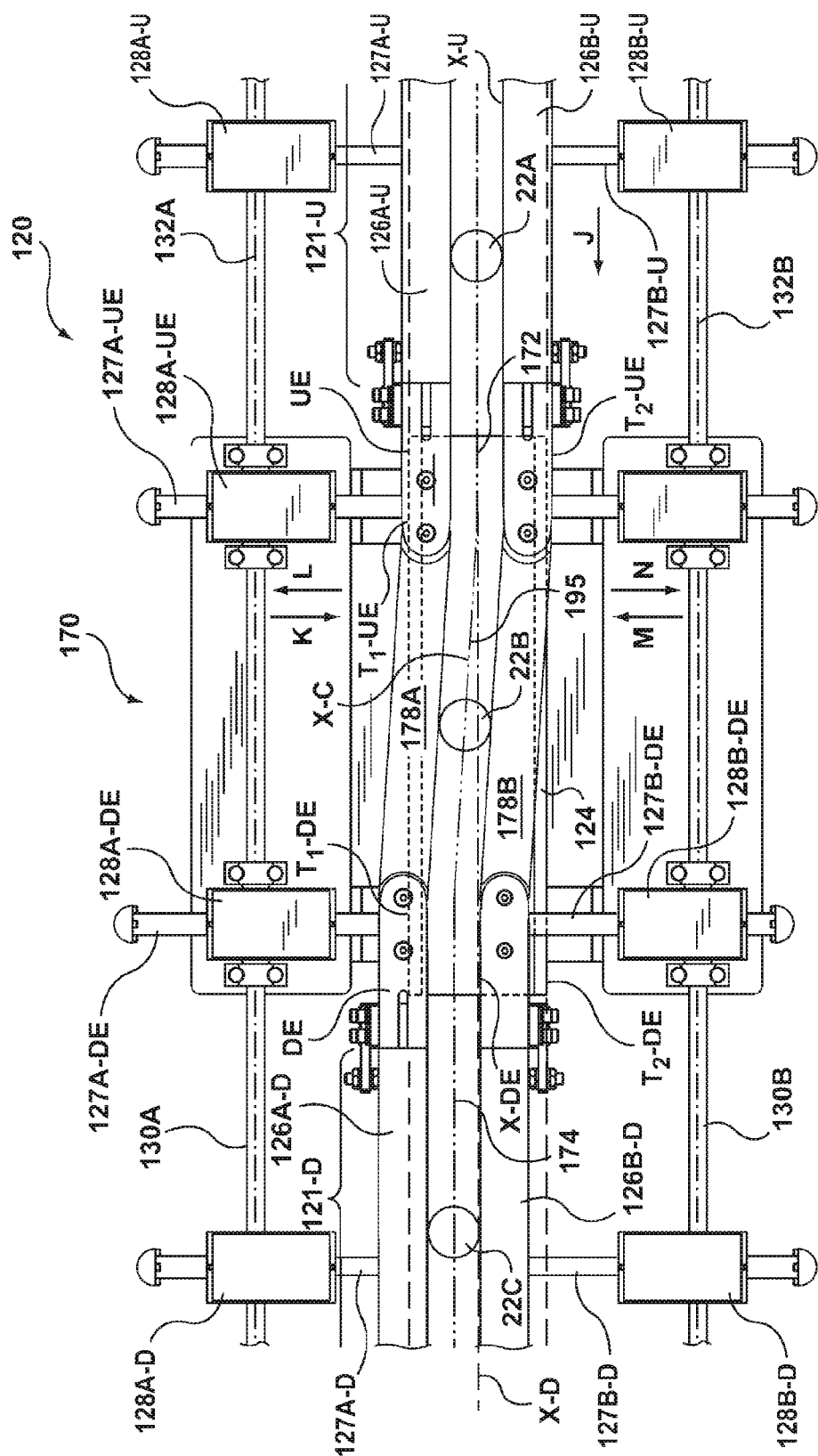
FIG. 3E is a plan view of an embodiment of the guide rail system of the invention including the centering device of FIG. 3A.

The guide rail system 120 is for guiding containers on the conveyor(s) 124 along which the containers are moved. (Three containers 22A, 22B, and 22C are shown at different locations in the system 120 in FIG. 3E, as will be described.) In one embodiment, the guide rail system 120 preferably includes a downstream segment 121-D at least partially defined by a downstream segment center line X-D of said at least one conveyor 124 substantially equidistant from first and second downstream segment sides $T_1$-D, $T_2$-D thereof (FIGS. 3D, 3E). As can be seen in FIG. 3E, the downstream segment 121-D preferably includes a number of first and second downstream segment contact portions 126A-D, 126B-D for engaging the containers, to at least partially locate the containers respectively in downstream segment preselected positions on conveyor 124 on the downstream path 174 partially defined by the first and second downstream segment contact portions. The downstream path 174 is partially located substantially equidistant between the first and second downstream segment contact portions 126A-D, 126B-D. The downstream segment also includes a number of first and second downstream segment adjustment elements 127A-D, 127B-D positioned proximal to the first and second downstream segment sides $T_1$-D, $T_2$-D respectively, the first and second downstream segment contact portions 126A-D, 126B-D being mounted on the first and second downstream segment adjustment elements 127A-D, 127B-D, respectively.

Also, the downstream segment includes a number of first and second downstream segment adjustable point devices 128A-D, 128B-D, the first and second downstream segment adjustable point devices being spaced apart from each other along the first and second downstream segment sides $T_1$-D, $T_2$-D respectively, the first and second downstream segment adjustment elements being mounted in the first and second downstream segment adjustable point devices 128A-D, 128B-D respectively and being transversely movable thereby relative to the downstream segment center line X-D for positioning the first and second downstream segment contact portions 126A-D, 126B-D in predetermined locations therefor relative to the downstream segment center line X-D for engagement thereby with the containers as the containers are moved past the first and second downstream segment contact portions by the conveyor 124, to at least partially locate the containers in the downstream segment preselected positions therefor.

Preferably, the guide rail system 120 also includes an upstream segment 121-U at least partially defined by an upstream segment center line X-U of the conveyor 124 substantially equidistant from first and second upstream sides $T_1$-U, $T_2$-U thereof (FIGS. 3D, 3E). The upstream segment preferably includes a number of first and second upstream segment contact portions 126A-U, 127B-U for engaging the containers, to at least partially locate the containers respectively in upstream segment preselected positions on the conveyor 124 on the upstream path 172 partially defined by the first and second upstream segment contact portions. The upstream path 172 is partially located substantially equidistant between the first and second upstream segment contact portions 126A-U, 126B-U.

It is also preferred that the upstream segment 121-U includes a number of first and second upstream segment adjustment elements 127A-U, 127B-U positioned proximal to the first and second upstream segment sides $T_1$-U, $T_2$-U respectively, the first and second upstream segment contact portions 126A-U, 126B-U being mounted on the first and second upstream segment adjustment elements respectively.

Also, the upstream segment 121-U preferably includes a number of first and second upstream segment adjustable point devices, the first and second upstream segment adjustable point devices 128A-U, 128B-U being spaced apart from each other along the first and second upstream segment sides $T_1$-U, $T_2$-U respectively, the first and second upstream segment adjustment elements 127A-U, 127B-U being mounted in the first and second upstream segment adjustable point devices respectively and being transversely movable thereby relative to the upstream segment center line for positioning the first and second upstream segment contact portions 126A-U, 126B-U in upstream segment predetermined locations therefor relative to the upstream segment center line X-U for engagement thereby with the containers as the containers are moved past the first and second upstream segment contact portions 126A-U, 126B-U by the conveyor 124, to at least partially locate the containers in the upstream segment preselected positions therefor.

As can be seen in FIG. 3E, the downstream and upstream segments 121-D, 121-U are spaced apart from each other longitudinally and transversely (i.e., they are transversely offset relative to each other).

It is also preferred that the guide rail system 120 includes the centering device 170 positioned between the downstream and upstream segments 121-D, 121-U, the centering device 170 extending between a downstream end DE thereof positioned adjacent to the downstream segment 121-D and an upstream end UE thereof positioned adjacent to the upstream segment 121-U. In one embodiment, the centering device preferably includes a downstream end portion 176-D (FIG. 3C) having first and second downstream end contact portions 126A-DE, 126B-DE (FIG. 3C) positioned proximal to the first and second downstream segment contact portions 126A-D, 126B-D (FIG. 3E) and substantially aligned with them respectively to partially define the downstream path 174. The centering device 170 preferably also includes an upstream end portion 176-U having first and second upstream end contact portions 126A-UE, 126B-UE (FIG. 3C) positioned proximal to the first and second upstream segment contact portions 126A-U, 126B-U (FIG. 3E) and substantially aligned with them respectively to partially define the upstream path 172.

Also, the centering device preferably includes first and second downstream end adjustable point devices 128A-DE, 128B-DE positioned proximal to the downstream end DE, the first and second downstream end adjustable point devices 128A-DE, 128B-DE preferably having first and second downstream end adjustment elements 127A-DE, 127B-DE mounted therein respectively, and transversely movable relative to the downstream end center line X-DE of the conveyor 124 located proximal to the downstream end portion 176-D.

It is also preferred that the centering device 170 includes first and second upstream end adjustable point devices 128A-UE, 128B-UE positioned proximal to the upstream end UE, the first and second upstream end adjustable point devices 128A-UE, 128B-UE having first and second upstream end adjustment elements 127A-UE, 127B-UE mounted therein respectively, and transversely movable relative to the upstream end center line X-UE of the conveyor 124 located proximal to the upstream end portion 176-U.

Preferably, the first and second downstream end contact portions 126A-DE, 126B-DE are mounted on the first and second downstream end adjustment elements 127A-DE, 127B-DE respectively, and the first and second upstream end contact portions 127A-UE, 127B-UE are mounted on the first and second upstream end adjustment elements 127A-UE, 127B-UE respectively.

The centering device 170 preferably also includes first and second main contact portions 178A, 178B extending between downstream and upstream ends thereof 180A, 180B and 182A, 182B and pivotally connected to the first and second downstream end contact portions 126A-DE, 126B-DE respectively and to the first and second upstream end contact portions 126A-UE, 126B-UE at its downstream and upstream ends respectively (FIG. 3C). Preferably, the first and second main contact portions 178A, 178B are positioned for engagement with the containers, to at least partially locate the containers in main portion preselected positions on the conveyor 124 on a central path 195 defined by the first and second main contact portions 178A, 178B. For example, in FIG. 3E, the container 22B is located in the main portion preselected position by the main contact portions 178A, 178B.

Preferably, the first and second downstream end contact portions 126A-DE, 126B-DE are positionable to partially define the downstream path 195 in first and second downstream end predetermined locations therefor by the first and second downstream end adjustment elements 127A-DE, 127B-DE respectively in which the first and second downstream end contact portions 126A-DE, 126B-DE are substantially aligned with the first and second downstream contact portions 126A-D, 126B-D, respectively.

Also, the first and second upstream end contact portions 126A-UE, 126B-UE preferably are positionable to partially define the upstream path 172 in upstream end predetermined locations therefor by the first and second upstream end adjustment elements 127A-UE, 127B-UE respectively in which the first and second upstream end contact portions 126A-UE, 126B-UE are substantially aligned with the first and second upstream contact portions 126A-U, 126B-U respectively.

The result is that the first and second upstream end contact portions 126A-UE, 126B-UE, the first and second main contact portions 178A, 178B, and the first and second downstream end contact portions 126A-DE, 126B-DE preferably are positioned to guide the containers from the upstream preselected positions therefor (i.e., on the upstream path 172) to the downstream preselected positions therefor (i.e., on the downstream path 174).

Based on the foregoing, it can be seen that the centering device 170 guides containers travelling on the conveyer from the upstream segment 121-U to the downstream segment 121-D, guiding the containers from the first path 172 to the second path 174. A direction of travel of the conveyor(s) is indicated in FIG. 3E by arrow "J". However, those skilled in the art will appreciate that the centering device 170 would also function properly if the direction of travel were in the opposite direction.

As can be seen in FIG. 3A, it is preferred that the main contact portions 178A, 178B overlap with the downstream end and upstream end contact portions where they are pivotally connected. In the following description, only the main contact portion 178B and the downstream end and upstream end contact portions on the second side are described in detail, and it will be understood that the main contact portion 178A and the other corresponding elements on the first side are the same in all material respects.

At its downstream and upstream ends 180A, 180B (FIG. 3C), the main contact portion 178B preferably includes lower downstream and upstream cooperating parts 183B, 184B (FIG. 3A). In addition, and as shown in FIG. 3A, the downstream end and the upstream end contact portions 126B-DE, 126B-UE preferably include upper downstream end and upstream end cooperating parts 185B, 186B. Preferably, the lower downstream cooperating part 183B extends under the upper downstream end cooperating part 185B (FIG. 3A). Similarly, the lower upstream cooperating part 184B preferably extends under the upper upstream end cooperating part 186B (FIG. 3A). The pivotal connection is effected with pins $P_1$, $P_2$ that pivotably connect the cooperating parts. It is also preferred that the centering device 170 includes posts 187B-DE, 187B-UE, and the pins $P_1$, $P_2$ preferably also are connected to the posts 187B-DE, 187B-UE respectively.

As can be seen, for example, in FIGS. 3A and 3B, in one embodiment, the contact portions 126A-DE, 178A, 126A-UE, 126B-DE, 178B, and 126B-UE preferably include upper and lower rails generally indicated in FIG. 3B by reference numerals 188A, 188B, 189A, 189B. Because the contact portions are configured in this way, the centering device 170 preferably includes posts, which are mounted to the adjustment elements. For example, in FIG. 3B, it can be seen that a post 187A-DE is mounted on the adjustment element 127A-DE, the post 187B-DE is mounted on the adjustment element 127B-DE, and the upper and lower rails 188A, 188B, 189A, 189B are secured to the posts. It will be understood that, in the centering device 170 illustrated in FIGS. 3A-3E, four posts are included, i.e., one post is attached to each of the four adjustment elements. Each of the upper rails 188A, 188B includes engagement surfaces 193A, 193B respectively. Also, the lower rails 189A, 189B preferably include engagement surfaces 194A, 194B. The engagement surfaces are for engagement with the containers as the containers are moved past the contact portions by the conveyor(s) 124.

Those skilled in the art will appreciate that the contact portions 126A-DE, 178A, 126A-UE, and 126B-DE, 178B, and 126B-UE may include only a single rail on each of the first and the second side. Alternatively, the contact portions may include more than two rails. Those skilled in the art will appreciate that the details of the structure of the contact portions preferably are determined with reference to the shapes of the containers that are to be guided by the contact portions.

As can be seen in FIG. 3E, the main contact portions 178A, 178B define a central path 195 therebetween along which the containers are moved by the conveyor(s) 124. The central path 195 is substantially equidistant between the main contact portions 178A, 178B. It will be understood that the engagement surfaces 193A, 193B, 194A, 194B are substantially continuous (FIGS. 3B, 3C). Because of this, the containers are smoothly guided from the first path 172 to the central path 195, and finally to the second path 174.

For example, as can be seen in FIG. 3E, the container 22A is shown in the first path 174, in the upstream segment 121-U. The container 22A is located in the upstream segment preselected position therefor on the upstream path 172 on the conveyor 124 by the contact portions 126A-U, 126B-U and by the upstream end contact portions 126A-UE, 126B-UE. The contact portions 126A-U, 126B-U are not aligned with the main contact portions 178A, 178B, i.e., the first path 172 is non-aligned with the central path 195. The upstream end contact portions 126A-UE, 126B-UE are substantially aligned with the upstream contact portions 126A-U, 126B-U. However, because the main contact portions 178A, 178B and the upstream end contact portions 126A-UE, 126B-UE, provide substantially continuous engagement surfaces for engaging the containers, the containers are smoothly redirected from the first path 172 to the central path 195. The container 22B is located in the main portion preselected position (on the central path 195) by the main contact portions 178A, 178B. At the downstream end DE, the containers are smoothly redirected from the central path 195 to the second path 174 by the downstream end contact portions 126A-DE, 126B-DE, to which the main contact portions 178A, 178B are pivotally connected. At the transition from the central path 195 to the second path (i.e., at the point where the downstream end contact portions 126A-DE, 126B-DE engage the containers), the containers are gently redirected by the downstream end contact portions, and the movement of the containers is relatively smooth because the engagement surfaces are substantially continuous. The container 22C is located in the downstream segment preselected position on the downstream path 174 by the downstream segment contact portions 126A-D, 126B-D and by the downstream end contact portions 126A-DE, 126B-DE.

From the foregoing, it can be seen that the central device effects a smooth transition between two segments of one or more conveyors that are transversely offset (i.e., non-aligned) relative to each other. Preferably, the guide rail system 120 also includes drive elements, for rapid uniform adjustment of contact portions. In one embodiment, the guide rail system 120 additionally includes a first drive element 130A (FIG. 3E). Preferably, the first drive element 130A is operably connected to the first downstream segment and first upstream segment adjustable point devices 128A-D, 128A-U, the first downstream end adjustable point device 128A-DE, and the first upstream end adjustable point device 128A-UE respectively, for locating the first downstream segment and first upstream segment adjustment elements 127A-D, 127A-U, the first downstream end adjustment element 127A-DE, and the first upstream end adjustment element 127A-UE respectively, upon rotation of the first drive element 130A about a first drive element axis 132A thereof, to position the first downstream and first upstream contact portions 126A-D, 126A-U in the downstream and upstream predetermined locations therefor respectively, and the first downstream end and first upstream end contact portions 126A-DE, 126A-UE in the first downstream end and first upstream end predetermined locations therefor. It is also preferred that the first downstream end and the first upstream end adjustment elements 127A-D, 127A-U are substantially uniformly movable upon rotation of the first drive element 130A about the first drive element axis 132A in unison with movement of the first downstream and first upstream adjustment elements 127A-D, 127A-U respectively.

In another embodiment, the guide rail system 120A preferably includes a second drive element 130B operably connected to the second downstream segment and second upstream segment adjustable point devices 128B-D, 128B-U, the second downstream end adjustable point device 128B-DE, and the second upstream end adjustable point device 128B-UE respectively, for locating the second downstream segment and second upstream segment adjustment elements 127B-D, 127B-U, the second downstream end adjustment element 127B-DE, and the second upstream end adjustment element 127B-UE respectively, upon rotation of the second upstream drive element 130B about a second drive element axis 132B thereof, to position the second downstream and second upstream contact portions 126B-D, 126B-U in the downstream and upstream predetermined locations therefor respectively, and the second downstream end and second upstream end contact portions 126B-DE, 126B-UE in the second downstream end and second upstream end predetermined locations therefor. It is also preferred that the second downstream end and the second upstream end adjustment elements 127B-D, 127B-U are substantially uniformly movable upon rotation of the second drive element 130B about the second drive element axis in unison with movement of the second downstream and second upstream adjustment elements 127B-D, 127B-U respectively.

As can be seen in FIG. 3E, the adjustment elements 127A-D, 127A-DE, 127A-UE, and 127A-U are movable inwardly or outwardly (i.e., indicated by arrows "K" and "L" respectively) upon rotation of the drive element 130A in the appropriate direction. Similarly, the adjustment elements 127B-D, 127B-DE, 127B-UE, and 127B-U are movable inwardly or outwardly (i.e., indicated by arrows "M" and "N" respectively) upon rotation of the drive element 130B in the appropriate direction. The positions of the main contact portions 178A, 178B relative to the downstream end and upstream end contact portions 126A-DE, 126B-DE and 126A-UE, 126B-UE does not substantially change when the adjustment elements are moved. Notwithstanding that the relative positions of the contact portions along one side does not materially change when the contact portions are transversely moved, the pivotal connection facilitates such transverse movement, as the pivotal connection enables the pivotally connected contact portions to move slightly relative to each other. This is advantageous in practice because it enables the contact portions to remain generally in the appropriate relative positions, e.g., if an adjustment element's movement is temporarily hindered.

Figure 3F:
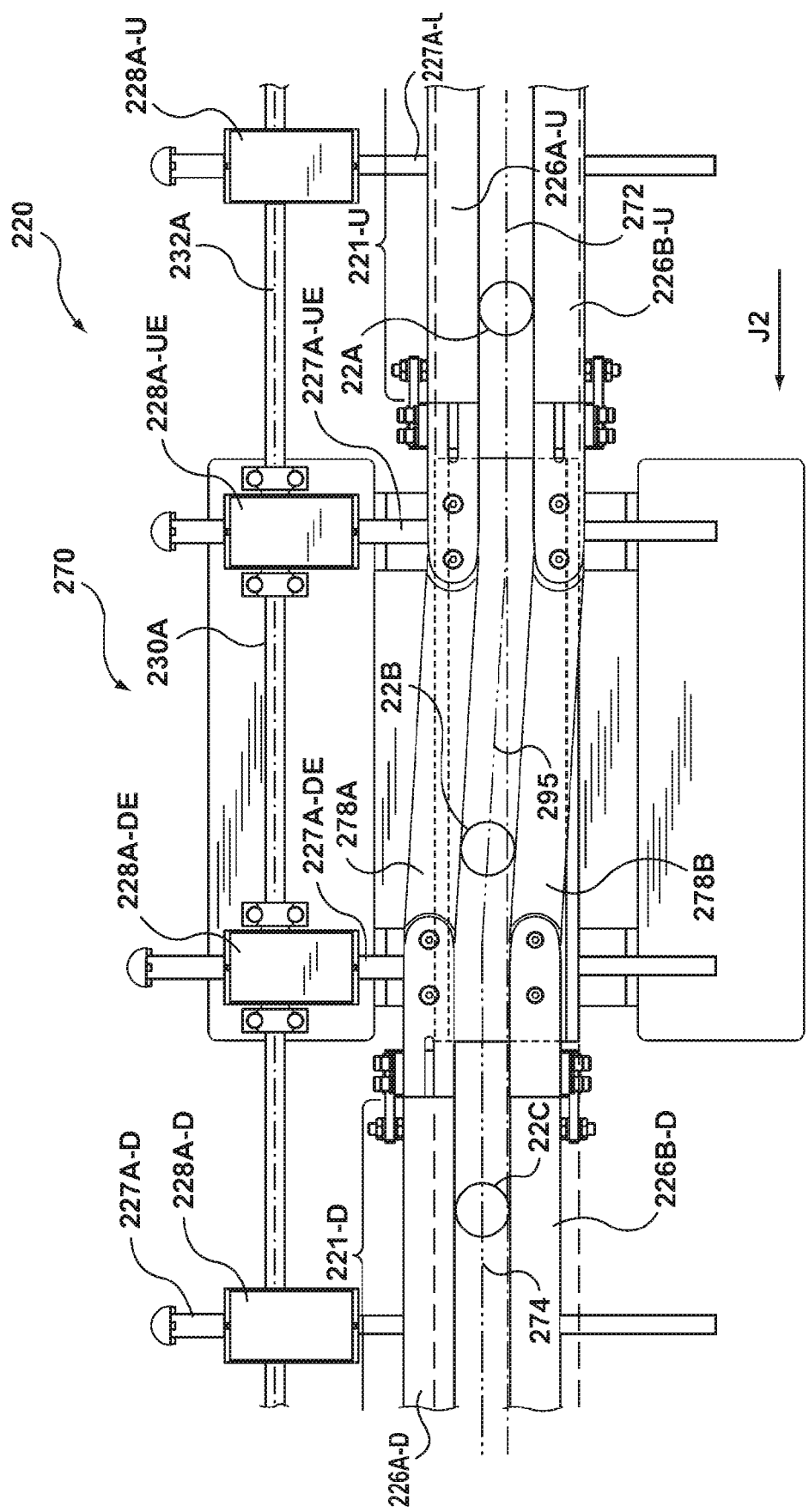
FIG. 3F is a plan view of an alternative embodiment of the guide rail system of the invention, including an alternative embodiment of the centering device of the invention.
Figure 3G:
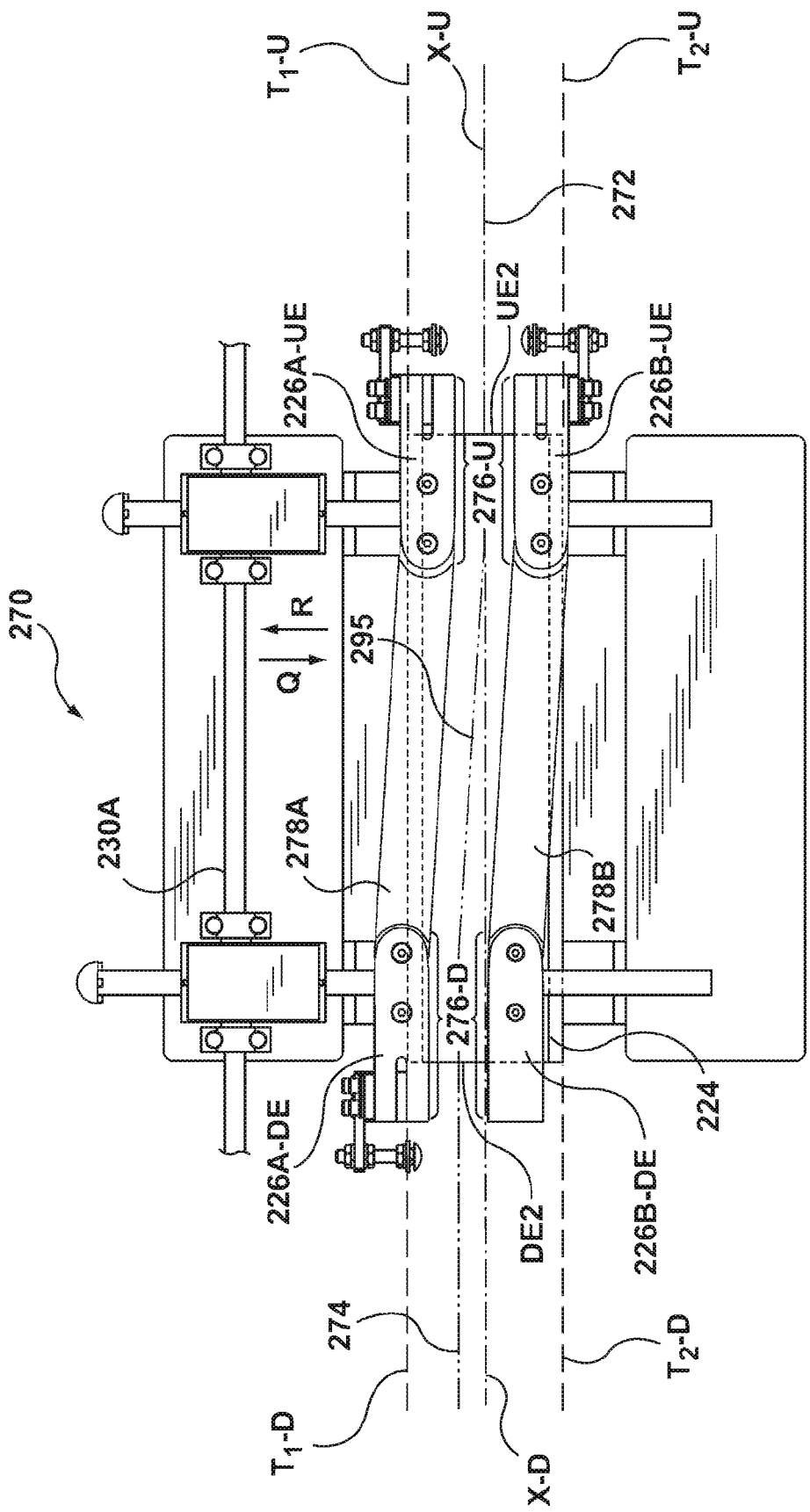
FIG. 3G is a plan view of the centering device of FIG. 3F.

Another embodiment of the guide rail system 220 of the invention is illustrated in FIGS. 3F and 3G. The direction of movement of the containers on the conveyor(s) 224 is indicated by arrow "J2" in FIG. 3F. Preferably, the guide rail system includes a downstream segment 221-D at least partially defined by a downstream segment center line X-D of one or more conveyors 224 substantially equidistant from first and second downstream segment sides $T_1$-D, $T_2$-D thereof. Preferably, the downstream segment 221-D includes first movable and second transversely fixed downstream segment contact portions 226A-D, 226B-D for engaging the containers, to at least partially locate the containers respectively in downstream segment preselected positions on the conveyor 224 on a downstream path 274 partially defined by the first and second downstream segment contact portions 226A-D, 226B-D. The downstream path 274 is partially located substantially equidistant between the first and second downstream segment contact portions 226A-D, 226B-D. Preferably, the downstream segment also includes one or more downstream adjustment elements 227A-D positioned proximal to the first downstream segment side $T_1$-D, the first movable downstream contact portion 226A-D being mounted on the downstream adjustment element(s) 227A-D. Also, the downstream segment preferably includes one or more downstream adjustable point devices 228A-D positioned proximal to the first downstream segment side $T_1$-D, for moving the downstream adjustment element mounted therein to position the first movable downstream contact portion 226A-D in a downstream predetermined location therefor relative to the downstream segment center line X-D. Also, the second transversely fixed downstream contact portion 226B-D preferably is positioned proximal to the second downstream segment side $T_2$-D.

The guide rail system 220 preferably also includes an upstream segment 221-U at least partially defined by an upstream segment center line X-U of the conveyor 224 substantially equidistant from first and second upstream segment sides $T_1$-U, $T_2$-U thereof. Preferably, the upstream segment 221-U includes first movable and second transversely fixed upstream segment contact portions 226A-U, 226B-U for engaging the containers, to at least partially locate the containers respectively in upstream segment preselected positions on the conveyor on an upstream path 272 partially defined by the first and second upstream segment contact portions 226A-U, 226B-U. The upstream path 272 is partially located substantially equidistant between the first and second upstream segment contact portions 226A-U, 226B-U. It is also preferred that the upstream segment includes one or more upstream adjustment elements 227A-U positioned proximal to the first upstream segment side $T_1$-U, the first movable upstream contact portion 226A-U being mounted on the upstream adjustment element 227A-U. Preferably, the upstream segment also includes one or more upstream adjustable point devices 228A-U positioned proximal to the first upstream segment side $T_1$-U, for moving the upstream adjustment element mounted therein to position the first movable upstream contact portion 226A-U in an upstream predetermined location therefor relative to the upstream segment center line X-U. Also, the second transversely fixed upstream contact portion 226B-U preferably is positioned proximal to the second upstream segment side $T_2$-U.

The guide rail system 220 preferably also includes a centering device 270 positioned between the upstream and downstream segments, the centering device extending between a downstream end DE2 thereof positioned adjacent to the downstream segment, and a upstream end UE2 thereof positioned adjacent to the upstream segment. Preferably, the conveyor 224 has a first central side 296 substantially extending between the first upstream side and the first downstream side, and a second central side 297 substantially extending between the second upstream side and the second downstream side. In one embodiment, the centering device includes a downstream end portion 276-D having a first movable downstream end contact portion 226A-DE positioned proximal to the first movable downstream segment portion 226A-D and substantially aligned with the first movable downstream segment contact portion 226A-D. The centering device 270 preferably also includes a second transversely fixed downstream end contact portion 226B-DE positioned proximal to the second transversely fixed downstream segment contact portion 226B-D and substantially aligned with the second transversely fixed downstream segment contact portion 226B-D to partially define the downstream path 274.

It is also preferred that the centering device 270 includes a first downstream end adjustable point device 228A-DE positioned proximal to the downstream end DE2, the first downstream end adjustable point device 226A-DE having a first downstream end adjustment element 227A-DE mounted therein, and transversely movable thereby relative to a downstream end center line of the conveyor 224 proximal to the downstream end portion. The centering device 270 preferably also includes an upstream end portion 276-U having a first movable upstream end contact portion 226A-UE positioned proximal to the first movable upstream segment contact portion 226A-U and substantially aligned therewith. Also, the upstream end portion preferably includes a second transversely fixed upstream end contact portion 226A-UE positioned proximal to the second transversely fixed upstream segment contact portion 226A-U to partially define the upstream path 272. Also, the centering device 270 has a first upstream end adjustable point device 228A-UE positioned proximal to the upstream end UE2. The first upstream end adjustable point device 228A-UE has a first upstream end adjustment element 227A-UE mounted therein and transversely movable thereby relative to an upstream end center line of the conveyor 224 proximal to the upstream end portion. Preferably, the centering device 270 also includes one or more central transversely fixed contact portions 278B positioned between the second transversely fixed downstream end and upstream end contact portions 226B-DE, 226B-UE. It is also preferred that the centering device 270 includes a movable main contact portion 278A extending between downstream and upstream ends thereof 280A, 282A and pivotally connected to the first downstream end movable contact portion 226A-DE and to the first upstream end movable contact portion 226A-UE at its downstream and upstream ends respectively (FIG. 3G). Preferably, the movable main contact portion 278A and the transversely fixed main contact portion 278B are positioned for engagement with the containers, to at least partially locate the containers in main portion preselected positions on the conveyor 224 on a central path 295 defined by the movable main contact portion 278A and the transversely fixed main contact portion 278B.

It is preferred that the first movable downstream end contact portion 226A-DE is positionable to partially define the downstream path 274 by the downstream end adjustment element 227A-DE to substantially align the first movable downstream end contact portion 226A-DE with the first movable downstream contact portion 226A-D. Also, it is preferred that the first movable upstream end contact portion 226A-UE is positionable to partially define the upstream path 272 by the upstream end adjustment element 227A-UE to substantially align the first movable upstream end contact portion 226A-DE with the first movable upstream contact portion 226A-U. Preferably, the first movable upstream end contact portion 226A-UE, the second transversely fixed upstream end contact portion 226B-UE, the movable main contact portion 278A, the transversely fixed main contact portion 278B, the movable downstream end contact portion 226A-DE, and the transversely fixed downstream end contact portion 226B-DE are positioned to guide the containers from the upstream segment preselected positions therefor (i.e., on the upstream path 272) to the downstream segment preselected positions therefor (i.e., on the downstream path 274). It will be understood that the contact portions include substantially continuous engagement surfaces for engagement with the containers, to provide a generally smooth transition from the upstream path 272 to the downstream path 274.

It will be appreciated by those skilled in the art that, although the guide rail system 220 as described preferably has movable contact portions on a particular side thereof (and transversely fixed side contact portions on the other side thereof), the movable contact portions may be located on such side as is needed, depending on the particular installation. A guide rail system having the contact portions (i.e., the rails) along one side of the conveyor may be a more economically feasible design if, for example, the circumstances are such that changes to the contact portions along one side during the operational life of the guide rail system are unlikely.

For example, as can be seen in FIG. 3F, the container 22A is engaged by the upstream and upstream end contact portions 226A-U, 226B-U, 226A-UE, 226B-UE to position the container 22A in an upstream preselected position on the upstream path 272. In addition, the container 22B is positioned on the central path 295 by the main portions 278A, 278B in a main portion preselected position. Also, the container 22C is positioned in a downstream preselected position on the downstream path 274 by the downstream end and the downstream segment contact portions 226A-DE, 226B-DE, 226A-D and 226B-D.

The upstream path 272 is substantially equidistant between the upstream and upstream end contact portions located along opposite (first and second) sides of the conveyor 224 and those located along the other side. The central path 295 is substantially equidistant between the main contact portions 278A, 278B. Finally, the downstream path 274 is substantially equidistant between the downstream and downstream end contact portions located along (first and second) opposite sides of the conveyor 224.

In one embodiment, the guide rail system 220 preferably includes a drive element 230A, which is operably connected to the adjustable point devices 228A-D, 228A-DE, 228A-UE, and 228-U. Upon rotation of the drive element 230A about an axis 232A thereof, the adjustment elements 227A-D, 227A-DE, 227A-UE, and 227A-U are substantially uniformly moved inwardly (i.e., in the direction indicated by arrow "Q" in FIG. 3G) or outwardly (i.e., in the direction indicated by arrow "R" in FIG. 3G).

It will be appreciated by those skilled in the art that the invention can take many forms, and that such forms are within the scope of the invention as described above. The foregoing descriptions are exemplary, and their scope should not be limited to the versions provided therein.

We claim:
1. A guide rail system for guiding containers on at least one conveyor on which the containers are moved, the guide rail system comprising:
a plurality of first and second contact portions for engaging the containers, to at least partially locate the containers respectively in preselected positions on at least one surface of said at least one conveyor relative to a center line of said at least one conveyor, the center line being located substantially equidistant from opposing first and second sides of said at least one conveyor;

a plurality of first and second adjustment elements positioned proximal to the first and second sides respectively, the first and second contact portions being mounted on the first and second adjustment elements respectively;

a plurality of first and second adjustable point devices, the first and second adjustable point devices being spaced apart from each other along the first and second sides respectively, the first and second adjustment elements being mounted in the first and second adjustable point devices respectively and being transversely movable thereby relative to the center line for positioning the first and second contact portions in predetermined locations therefor relative to the center line for engagement thereby with the containers as the containers are moved past the first and second contact portions by said at least one conveyor, to at least partially locate the containers in the preselected positions therefor;

at least one height adjustment assembly for positioning side contact portions selected from the group consisting of the first contact portions, the second contact portions, and the first and second contact portions in the predetermined locations therefor relative to said at least one surface of said at least one conveyor;

first and second drive elements rotatable about first and second rotation axes thereof respectively; and the first and second drive elements being operably connected to the first and second adjustable point devices respectively, for effecting substantially uniform movement of the first adjustment elements transversely relative to the center line upon rotation of the first drive element about the first rotation axis, and for effecting substantially uniform movement of the second adjustment elements transversely relative to the center line upon rotation of the second drive element about the second rotation axis.

2. A guide rail system according to claim 1 additionally comprising:

a plurality of central contact portions for engaging preselected parts of the containers respectively, to at least partially locate the containers in the preselected positions respectively on said at least one surface of said at least one conveyor relative to the center line of said at least one conveyor;

a plurality of central adjustment elements, the central contact portions being mounted on the central adjustment elements respectively;

a plurality of central adjustable point devices, the central adjustable point devices being spaced apart from each other along said at least one conveyor between the first and second sides, the central adjustment elements being mounted in the central adjustable point devices respectively, the central adjustment elements being movable thereby relative to said at least one surface for positioning the central contact portions for engagement with the preselected parts of the containers as the containers are moved past the central contact portions by said at least one conveyor, to at least partially locate the containers in the preselected positions therefor;

at least one central drive element rotatable about a central drive element axis thereof; and said at least one central drive element being operably connected to the central adjustable point devices for substantially uniform movement of the central contact portions upon rotation of said at least one central drive element about the central drive element axis.

3. A guide rail system according to claim 2 additionally comprising:

a plurality of transverse assemblies for moving the central adjustable point devices transversely relative to the center line, for positioning the central contact portions respectively for engagement with the preselected parts of the containers as the containers are moved past the central contact portions by said at least one conveyor to at least partially locate the containers in the preselected positions therefor;

the transverse assemblies being spaced apart from each other along said at least one conveyor;

at least one transverse assembly drive element rotatable about a transverse assembly drive element axis thereof; and said at least one transverse assembly drive element being operably connected to the transverse assemblies for substantially uniform transverse movement of the central adjustable point devices relative to the center line of said at least one conveyor upon rotation of said at least one transverse assembly drive element about the transverse assembly drive element axis.

4. A guide rail system for guiding containers on at least one conveyor on which the containers are moved, the guide rail system comprising:

at least one movable contact portion;

at least one transversely fixed contact portion;

said at least one movable contact portion and said at least one transversely fixed contact portion being formed for engaging the containers, to at least partially locate the containers respectively in preselected positions on at least one surface of said at least one conveyor relative to a center line of said at least one conveyor, the center line being located substantially equidistant from opposing first and second sides of said at least one conveyor, said at least one movable contact portion and said at least one transversely fixed contact portion being positioned proximal to the first and second sides respectively;

a plurality of adjustment elements spaced apart from each other along the first side, said at least one movable contact portion being mounted on the adjustment elements for positioning said at least one movable contact portion in a first predetermined location therefor relative to the center line;

said at least one transversely fixed contact portion being positioned in a second predetermined location therefor relative to the center line;

a plurality of adjustable point devices, the adjustment elements being mounted in the adjustable point devices respectively and being transversely movable thereby relative to the center line for positioning said at least one contact portion in the first predetermined location therefor relative to the center line;

said at least one movable contact portion and said at least one transversely fixed contact portion being positioned for engagement with the containers as the containers are moved by said at least one conveyor, to at least partially locate the containers in the preselected positions therefor, when said at least one movable contact portion and said at least one transversely fixed contact portion are in the first and second predetermined locations therefor respectively;

at least one height adjustment assembly for positioning side contact portions selected from the group consisting of said at least one movable contact portion, said at least one transversely fixed contact portion, and said at least one movable contact portion and said at least one transversely fixed contact portion in predetermined locations therefor heightwise relative to said at least one surface of said at least one conveyor;
a drive element rotatable about a rotation axis thereof; and
the drive element being operably connected to the adjustable point devices, for effecting substantially uniform movement of the adjustment elements transversely relative to the center line upon rotation of the drive element about the rotation axis.

5. A guide rail system according to claim 4 additionally comprising:
at least one height adjustment drive element rotatable about a height adjustment rotation axis; and
said at least one height adjustment drive element being operably connected to said at least one height adjustment assembly for effecting substantially uniform movement of the side contact portions positionable by said at least one height adjustment assembly relative to said at least one surface upon rotation of the height adjustment drive element about the height adjustment rotation axis.

6. A guide rail system according to claim 4 additionally comprising:
a plurality of central contact portions for engaging preselected parts of the containers respectively, to at least partially locate the containers in the preselected positions respectively on said at least one surface of said at least one conveyor relative to the center line of said at least one conveyor;
a plurality of central adjustment elements, the central contact portions being mounted on the central adjustment elements respectively;
a plurality of central adjustable point devices, the central adjustable point devices being spaced apart along said at least one conveyor between the first and second sides, the central adjustment elements being mounted in the central adjustable point devices respectively, the central adjustment elements being movable thereby relative to said at least one surface for positioning the central contact portions for engagement with the preselected parts of the containers as the containers are moved past the central contact portions by said at least one conveyor, to at least partially locate the containers in the preselected positions therefor;
at least one central drive element rotatable about a central drive element axis thereof; and
said at least one central drive element being operably connected to the central adjustable point devices for substantially uniform movement of the central contact portions upon rotation of said at least one central drive element about the central drive element axis.

7. A guide rail system according to claim 6 additionally comprising:
a plurality of transverse assemblies for moving the central adjustable point devices transversely relative to the center line, for positioning the central contact portions respectively for engagement with the preselected parts of the containers as the containers are moved past the central contact portions by said at least one conveyor to at least partially locate the containers in the preselected positions therefor;
the transverse assemblies being spaced apart from each other along said at least one conveyor;

at least one transverse assembly drive element rotatable about a transverse assembly drive element axis thereof; and
said at least one transverse assembly drive element being operably connected to the transverse assemblies for substantially uniform transverse movement of the central contact portions relative to the center line of said at least one conveyor upon rotation of said at least one transverse assembly drive element about the transverse assembly drive element axis.

8. A guide rail system for guiding containers on at least one conveyor on which the containers are moved, the guide rail system comprising:
a plurality of central contact portions for engaging preselected parts of the containers respectively, to at least partially locate the containers in preselected positions respectively on at least one surface of said at least one conveyor relative to a center line of said at least one conveyor, the center line being located substantially equidistant from opposing first and second sides of said at least one conveyor;
a plurality of central adjustment elements, the central contact portions being mounted on the central adjustment elements respectively;
a plurality of central adjustable point devices, the central adjustable point devices being spaced apart along said at least one conveyor between the first and second sides, the central adjustment elements being mounted in the central adjustable point devices respectively, the central adjustment elements being movable thereby relative to said at least one surface for positioning the central contact portions for engagement with the preselected parts of the containers as the containers are moved past the central contact portions by said at least one conveyor, to at least partially locate the containers in the preselected positions therefor;
a plurality of transverse assemblies for moving the central adjustable point devices transversely relative to the center line, for positioning the central contact portions respectively for engagement with the preselected parts of the containers as the containers are moved past the central contact portions by said at least one conveyor to at least partially locate the containers in the preselected positions therefor;
the transverse assemblies being spaced apart from each other along said at least one conveyor;
at least one central drive element rotatable about a central drive element axis thereof;
said at least one central drive element being operably connected to the central adjustable point devices for substantially uniform movement of the central contact portions upon rotation of said at least one central drive element about the central drive element axis;
at least one transverse assembly drive element rotatable about a transverse assembly drive element axis thereof; and
said at least one transverse assembly drive element being operably connected to the transverse assemblies for substantially uniform transverse movement of the central contact portions relative to the center line of said at least one conveyor upon rotation of said at least one transverse assembly drive element about the transverse assembly drive element axis.

9. A guide rail system for guiding containers on at least one conveyor along which the containers are moved, the guide rail system comprising:

a downstream segment at least partially defined by a downstream segment center line of said at least one conveyor substantially equidistant from first and second downstream segment sides thereof, the downstream segment comprising:
  a plurality of first and second downstream segment contact portions for engaging the containers, to at least partially locate the containers respectively in downstream segment preselected positions on said at least one conveyor on a downstream path partially defined by the first and second downstream segment contact portions;
  a plurality of first and second downstream segment adjustment elements positioned proximal to the first and second downstream segment sides respectively, the first and second downstream segment contact portions being mounted on the first and second downstream segment adjustment elements respectively;
  a plurality of first and second downstream segment adjustable point devices, the first and second downstream segment adjustable point devices being spaced apart from each other along the first and second downstream segment sides respectively, the first and second downstream segment adjustment elements being mounted in the first and second downstream segment adjustable point devices respectively and being transversely movable thereby relative to the downstream segment center line for positioning the first and second downstream segment contact portions in predetermined locations therefor relative to the downstream segment center line for engagement thereby with the containers as the containers are moved past the first and second downstream segment contact portions by said at least one conveyor, to at least partially locate the containers in the downstream segment preselected positions therefor;
an upstream segment at least partially defined by an upstream segment center line of said at least one conveyor substantially equidistant from first and second upstream sides thereof, the upstream segment comprising:
  a plurality of first and second upstream segment contact portions for engaging the containers, to at least partially locate the containers respectively in upstream segment preselected positions on said at least one conveyor on an upstream path partially defined by the first and second upstream segment contact portions;
  a plurality of first and second upstream segment adjustment elements positioned proximal to the first and second upstream segment sides respectively, the first and second upstream segment contact portions being mounted on the first and second upstream segment adjustment elements respectively;
  a plurality of first and second upstream segment adjustable point devices, the first and second upstream segment adjustable point devices being spaced apart from each other along the first and second upstream segment sides respectively, the first and second upstream segment adjustment elements being mounted in the first and second upstream segment adjustable point devices respectively and being transversely movable thereby relative to the upstream segment center line for positioning the first and second upstream segment contact portions in upstream segment predetermined locations therefor relative to the upstream segment center line for engagement thereby with the containers as the containers are moved past the first and second upstream segment contact portions by said at least one conveyor, to at least partially locate the containers in the upstream segment preselected positions therefor;
the downstream and upstream segments being spaced apart from each other longitudinally and transversely;
a centering device positioned between the downstream and upstream segments, the centering device extending between a downstream end thereof positioned adjacent to the downstream segment and an upstream end thereof positioned adjacent to the upstream segment, the centering device comprising:
  a downstream end portion comprising first and second downstream end contact portions positioned proximal to the first and second downstream segment contact portions and substantially aligned with the first and second downstream contact portions respectively to partially define the downstream path;
  an upstream end portion comprising first and second upstream end contact portions positioned proximal to the first and second upstream segment contact portions and substantially aligned with the first and second upstream segment contact portions respectively to partially define the upstream path;
  first and second downstream end adjustable point devices positioned proximal to the downstream end, the first and second downstream end adjustable point devices comprising first and second downstream end adjustment elements mounted therein respectively, and transversely movable relative to a downstream end center line of said at least one conveyor located proximal to the downstream end portion;
  first and second upstream end adjustable point devices positioned proximal to the upstream end, the first and second upstream end adjustable point devices comprising first and second upstream end adjustment elements mounted therein respectively, and transversely movable relative to an upstream end center line of said at least one conveyor located proximal to the upstream end portion;
  the first and second downstream end contact portions being mounted on the first and second downstream end adjustment elements respectively;
  the first and second upstream end contact portions being mounted on the first and second upstream end adjustment elements respectively;
  first and second main contact portions extending between downstream and upstream ends thereof and pivotally connected to the first and second downstream end contact portions respectively and to the first and second upstream end contact portions at its downstream and upstream ends respectively, the first and second main contact portions being positioned for engagement with the containers, to at least partially locate the containers in main portion preselected positions on said at least one conveyor on a central path defined by the first and second main contact portions;
  the first and second downstream end contact portions being positionable to partially define the downstream path in first and second downstream end predetermined locations therefor respectively by the first and second downstream end adjustment elements respectively in which the first and second downstream end contact portions are substantially aligned with the first and second downstream contact portions respectively;

the first and second upstream end contact portions being positionable to partially define the upstream path in upstream end predetermined locations therefor by the first and second upstream end adjustment elements respectively in which the first and second upstream end contact portions are substantially aligned with the first and second upstream contact portions respectively; and the first and second upstream end contact portions, the first and second main contact portions, and the first and second downstream end contact portions being positioned to guide the containers from the upstream preselected positions therefor to the downstream preselected positions therefor.

10. A guide rail system according to claim 9 additionally comprising:

a first drive element operably connected to the first downstream segment and first upstream segment adjustable point devices, the first downstream end adjustable point device, and the first upstream end adjustable point device respectively, for locating the first downstream segment and first upstream segment adjustment elements, the first downstream end adjustment element, and the first upstream end adjustment element respectively, upon rotation of the first drive element about a first drive element axis thereof, to position the first downstream and first upstream contact portions in the downstream and upstream predetermined locations therefor respectively, and the first downstream end and first upstream end contact portions in the first downstream end and first upstream end predetermined locations therefor; and the first downstream end and the first upstream end adjustment elements being substantially uniformly movable upon rotation of the first drive element about the first drive element axis in unison with movement of the first downstream and first upstream adjustment elements respectively.

11. A guide rail system according to claim 10 additionally comprising:

a second drive element operably connected to the second downstream segment and second upstream segment adjustable point devices, the second downstream end adjustable point device, and the second upstream end adjustable point device respectively, for locating the second downstream segment and second upstream segment adjustment elements, the second downstream end adjustment element, and the second upstream end adjustment element respectively, upon rotation of the second upstream drive element about a second drive element axis thereof, to position the second downstream and second upstream contact portions in the downstream and upstream predetermined locations therefor respectively, and the second downstream end and second upstream end contact portions in the second downstream end and second upstream end predetermined locations therefor; and the second downstream end and the second upstream end adjustment elements being substantially uniformly movable upon rotation of the second drive element about the second drive element axis in unison with movement of the second downstream and second upstream adjustment elements respectively.

12. A guide rail system for guiding containers on at least one conveyor along which the containers are moved, the guide rail system comprising:

a downstream segment at least partially defined by a downstream segment center line of said at least one conveyor substantially equidistant from first and second downstream segment sides thereof, the downstream segment comprising:

first movable downstream and second transversely fixed downstream segment contact portions for engaging the containers, to at least partially locate the containers respectively in downstream segment preselected positions on said at least one conveyor on a downstream path partially defined by the first and second downstream segment contact portions;

at least one downstream adjustment element positioned proximal to the first downstream segment side, the first movable downstream contact portion being mounted on said at least one downstream adjustment element;

at least one downstream adjustable point device positioned proximal to the first downstream segment side, for moving said at least one downstream adjustment element mounted in said at least one downstream adjustable point device to position the first movable downstream contact portion in a downstream predetermined location therefor relative to the downstream segment center line;

the second transversely fixed downstream contact portion being positioned proximal to the second downstream segment side;

an upstream segment at least partially defined by an upstream segment center line of said at least one conveyor substantially equidistant from first and second upstream segment sides thereof, the upstream segment comprising:

first movable upstream and second transversely fixed upstream segment contact portions for engaging the containers, to at least partially locate the containers respectively in upstream segment preselected positions on said at least one conveyor on an upstream path partially defined by the first and second contact portions;

at least one upstream adjustment element positioned proximal to the first upstream segment side, the first movable upstream contact portion being mounted on said at least one upstream adjustment element;

at least one upstream adjustable point device positioned proximal to the upstream segment, for moving said at least one upstream adjustment element mounted in said at least one upstream adjustable point device to position the first movable upstream contact portion in an upstream predetermined location therefor relative to the upstream segment center line;

the second transversely fixed upstream contact portion being positioned proximal to the second upstream segment side;

a centering device positioned between the upstream and downstream segments, the centering device extending between a downstream end thereof positioned adjacent to the downstream segment, and a upstream end thereof positioned adjacent to the upstream segment;

said at least one conveyor comprising a first central side substantially extending between the first upstream side and the first downstream side, and a second central side substantially extending between the second upstream side and the second downstream side;

the centering device comprising:

a downstream end portion comprising a first movable downstream end contact portion positioned proximal to the first movable downstream contact portion and substantially aligned with the first movable downstream contact portion and a second transversely fixed downstream end contact portion positioned proximal to the second transversely fixed contact portion and substantially aligned with the second transversely fixed downstream contact portion to partially define the downstream path;

a first downstream end adjustable point device positioned proximal to the downstream end, the first downstream end adjustable point device comprising a first downstream end adjustment element mounted therein, and transversely movable thereby relative to a downstream end center line of said at least one conveyor proximal to the downstream end portion;

an upstream end portion comprising a first movable upstream end contact portion positioned proximal to the first movable upstream segment contact portion and substantially aligned with the first movable upstream contact portion and a second transversely fixed upstream end contact portion positioned proximal to the second transversely fixed upstream segment contact portion to partially define the upstream path;

a first upstream end adjustable point device positioned proximal to the upstream end, the first upstream end adjustable point device comprising a first upstream end adjustment element mounted therein, and transversely movable thereby relative to an upstream end center line of said at least one conveyor proximal to the upstream end portion;

at least one transversely fixed main contact portion positioned between the second transversely fixed downstream end and upstream end contact portions;

a movable main contact portion extending between downstream and upstream ends thereof and pivotally connected to the first downstream end movable contact portion and to the first upstream end movable contact portion at its downstream and upstream ends respectively, the movable main contact portion and said at least one transversely fixed main contact portion being positioned for engagement with the containers to at least partially locate the containers in main portion preselected positions on said at least one conveyor on a central path defined by the movable main contact portion and the transversely fixed main contact portion;

the first movable downstream end contact portion being positionable to partially define the downstream path by the downstream end adjustment element to substantially align the first movable downstream end contact portion with the first movable downstream contact portion;

the first movable upstream end contact portion being positionable relative to partially define the upstream path by the upstream end adjustment element to substantially align the first movable upstream end contact portion with the first movable upstream contact portion; and the first movable upstream end contact portion, the second transversely fixed upstream contact portion, the movable main contact portion, the transversely fixed main contact portion, the first movable downstream end contact portion, and the second transversely fixed downstream contact portion being positioned to guide the containers from the upstream segment preselected positions therefor to the downstream segment preselected positions therefor.

* * * * *